US012719623B2

(12) United States Patent
Soltani et al.

(10) Patent No.: US 12,719,623 B2
(45) Date of Patent: Aug. 25, 2026

(54) SLOT FORMAT SWITCHING FOR MULTIPLEXING REFERENCE SIGNALS AND DATA

(71) Applicant: QUALCOMM Incorporated, San Diego, CA (US)

(72) Inventors: Morteza Soltani, San Diego, CA (US); Jing Sun, San Diego, CA (US); Xiaoxia Zhang, San Diego, CA (US); Iyab Issam Sakhnini, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/464,151

(22) Filed: Sep. 8, 2023

(65) Prior Publication Data

US 2025/0088326 A1 Mar. 13, 2025

(51) Int. Cl.
*H04L 5/00* (2006.01)
*H04W 72/23* (2023.01)

(52) U.S. Cl.
CPC .......... *H04L 5/0005* (2013.01); *H04L 5/0048* (2013.01); *H04L 5/0092* (2013.01); *H04W 72/23* (2023.01)

(58) Field of Classification Search
CPC ... H04L 5/0005; H04L 5/0048; H04L 5/0092; H04W 72/23–232
See application file for complete search history.

(56) References Cited

U.S. PATENT DOCUMENTS

| | | | | |
|---|---|---|---|---|
| 11,005,624 B2 * | 5/2021 | Kim | H04L 5/0048 |
| 11,399,362 B2 | 7/2022 | Hwang et al. | |
| 2010/0034077 A1 * | 2/2010 | Ishii | H04L 5/0032 370/210 |

(Continued)

FOREIGN PATENT DOCUMENTS

| | | | |
|---|---|---|---|
| WO | WO2020258046 A1 | 12/2020 | |
| WO | WO2022264730 A1 | 12/2022 | |
| WO | WO-2023081225 A1 * | 5/2023 | H04L 5/0007 |

OTHER PUBLICATIONS

International Search Report and Written Opinion—PCT/US2024/044412—ISA/EPO—Nov. 20, 2024.

*Primary Examiner* — Kevin C. Harper
(74) *Attorney, Agent, or Firm* — Holland & Hart LLP

(57) ABSTRACT

Methods, systems, and devices for wireless communications are described. A user equipment (UE) may receive a control message indicating to switch from a first slot format to a second slot format. The first slot format may include symbols for reference signal transmissions and symbols for data transmissions. Thus, the first slot format may be a full-TDM slot that supports time division multiplexing (TDM) reference signals and data. The second slot format may be a hybrid TDM/frequency division multiplexing (FDM) slot or a full-FDM slot that includes at least one symbol for frequency division multiplexing (FDM) reference signals and data. Based on a capability of the UE and the control message, the UE may switch to the second slot format and communicate a reference signal in a symbol configured for FDM. That is, the reference signal may be FDMed with data according to the second slot format.

24 Claims, 18 Drawing Sheets

(56) References Cited

U.S. PATENT DOCUMENTS

| | | | | |
|---|---|---|---|---|
| 2014/0334437 | A1* | 11/2014 | Jongren | H04L 5/0096 370/330 |
| 2017/0353947 | A1* | 12/2017 | Ang | H04L 5/0048 |
| 2018/0014254 | A1* | 1/2018 | Hwang | H04W 72/0473 |
| 2018/0219662 | A1 | 8/2018 | Kim et al. | |
| 2019/0334676 | A1 | 10/2019 | Liu et al. | |
| 2019/0349992 | A1* | 11/2019 | Zhang | H04L 27/0006 |
| 2020/0084778 | A1* | 3/2020 | Wang | H04W 72/0473 |
| 2021/0289482 | A1* | 9/2021 | Bar-Or Tillinger | H04W 72/23 |
| 2022/0417935 | A1 | 12/2022 | Sakhnini et al. | |
| 2023/0006762 | A1 | 1/2023 | Levitsky et al. | |

* cited by examiner

Receive a control message indicating to switch from a first slot format to a second slot format, where the first slot format includes one or more symbols for reference signal transmissions and one or more symbols for data transmissions, and where the second slot format includes at least one symbol for frequency division multiplexing a reference signal and data

1305

Communicate, based at least in part on the switch from the first slot format to the second slot format, the reference signal via the at least one symbol, where the reference signal is frequency division multiplexed with the data in accordance with the second slot format

1310

1300

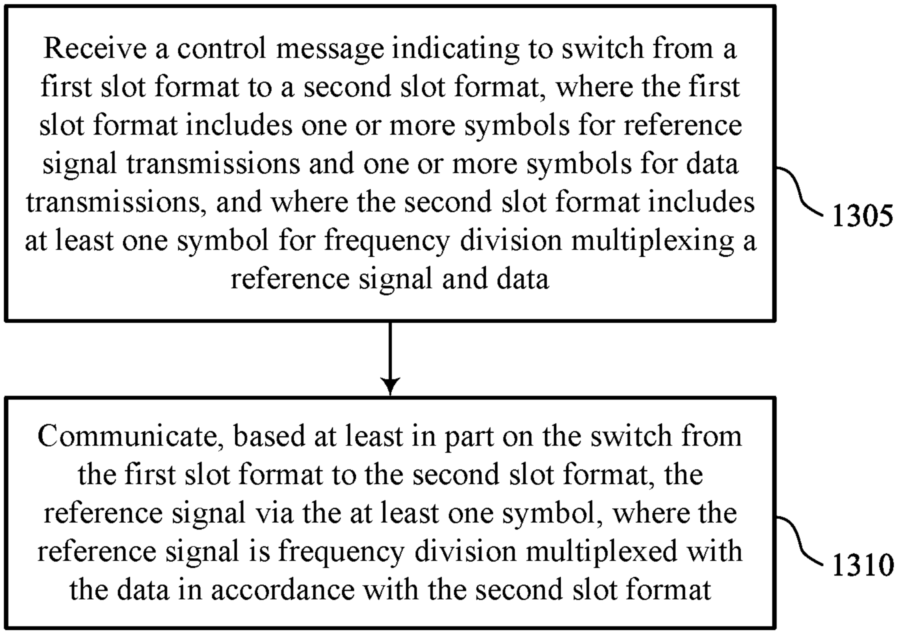

FIG. 13

Transmit a control message indicating to a UE to switch from a first slot format to a second slot format, where the first slot format includes one or more symbols for reference signal transmissions and one or more symbols for data transmissions, and where the second slot format includes at least one symbol for frequency division multiplexing a reference signal and data

1605

Communicate, based at least in part on the control message indicating to the UE to switch from the first slot format to the second slot format, the reference signal via the at least one symbol, where the reference signal is frequency division multiplexed with the data in accordance with the second slot format

1610

1600

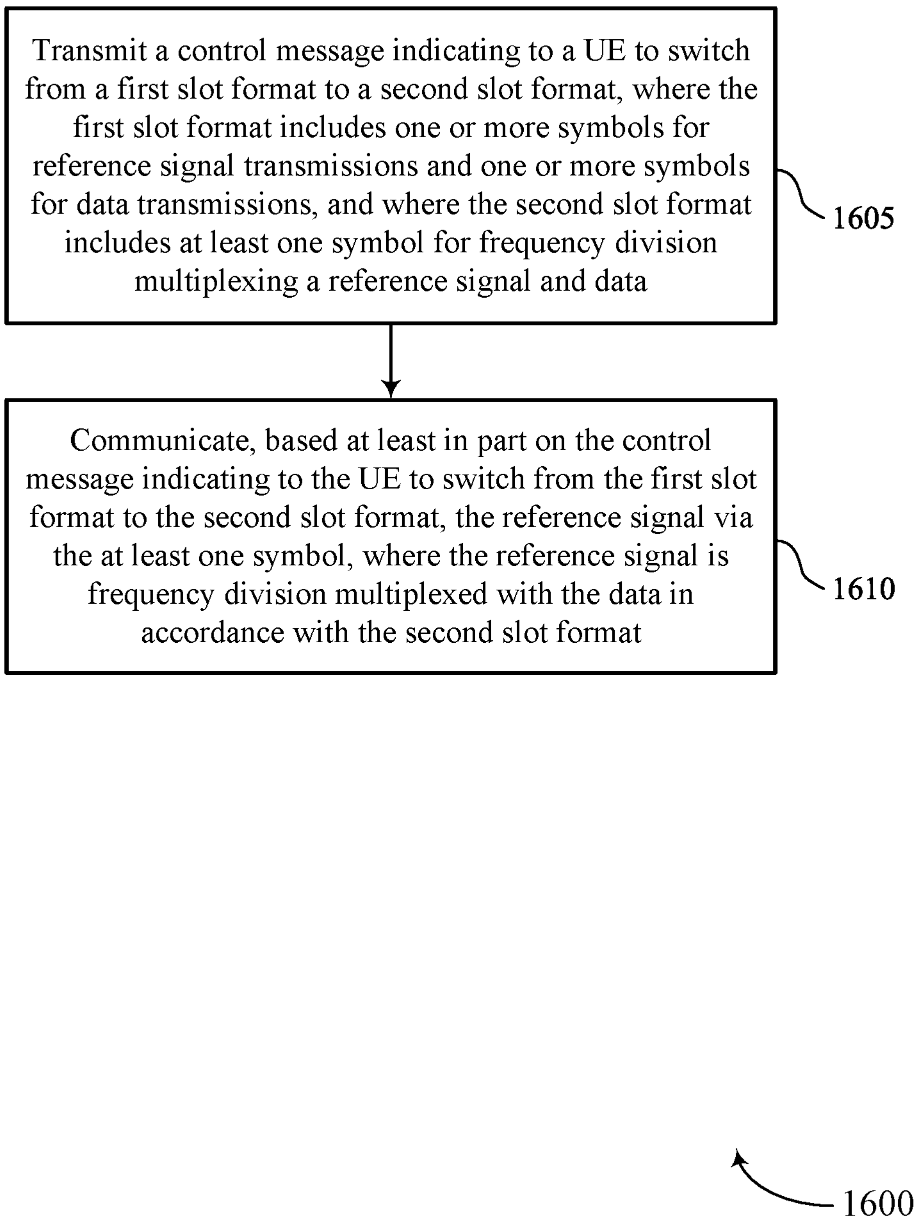

FIG. 16

Transmit a control message indicating to a UE to switch from a first slot format to a second slot format, where the first slot format includes one or more symbols for reference signal transmissions and one or more symbols for data transmissions, and where the second slot format includes at least one symbol for both data and reference signal transmissions and includes at least one symbol for the data transmissions

1705

Transmit downlink control information activating at least one symbol for both data and reference signal transmissions and at least one symbol for data transmissions, where the second slot format includes at least a first symbol for the data transmissions that is associated with a UE and a second symbol for both the data and reference signal transmissions that is associated with a second UE

1710

Communicate, based at least in part on the control message indicating to the UE from the first slot format to the second slot format, the reference signal via the at least one symbol, where the reference signal is frequency division multiplexed with the data in accordance with the second slot format

1715

1700

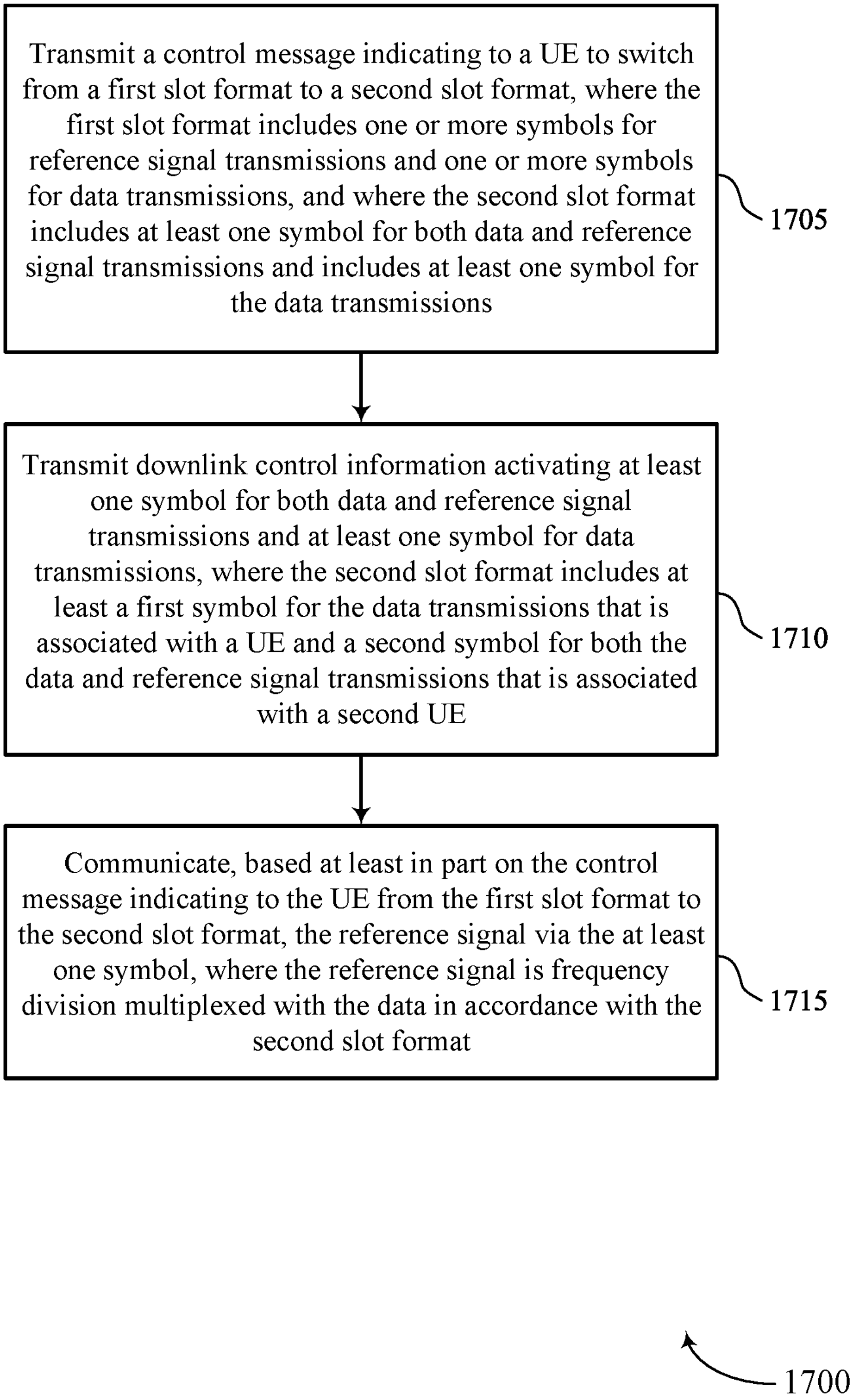

FIG. 17

Transmit a control message indicating to a UE to switch from a first slot format to a second slot format, where the first slot format includes one or more symbols for reference signal transmissions and one or more symbols for data transmissions, and where the second slot format includes at least one symbol for both data and reference signal transmissions and includes at least one symbol for the data transmissions

1805

Transmit a medium access control control element activating the at least one symbol for both the data and reference signal transmissions and the at least one symbol for the data transmissions based on a modulation and coding scheme change for a slot

1810

Communicate, based at least in part on the control message indicating to the UE from the first slot format to the second slot format, the reference signal via the at least one symbol, where the reference signal is frequency division multiplexed with the data in accordance with the second slot format

1815

1800

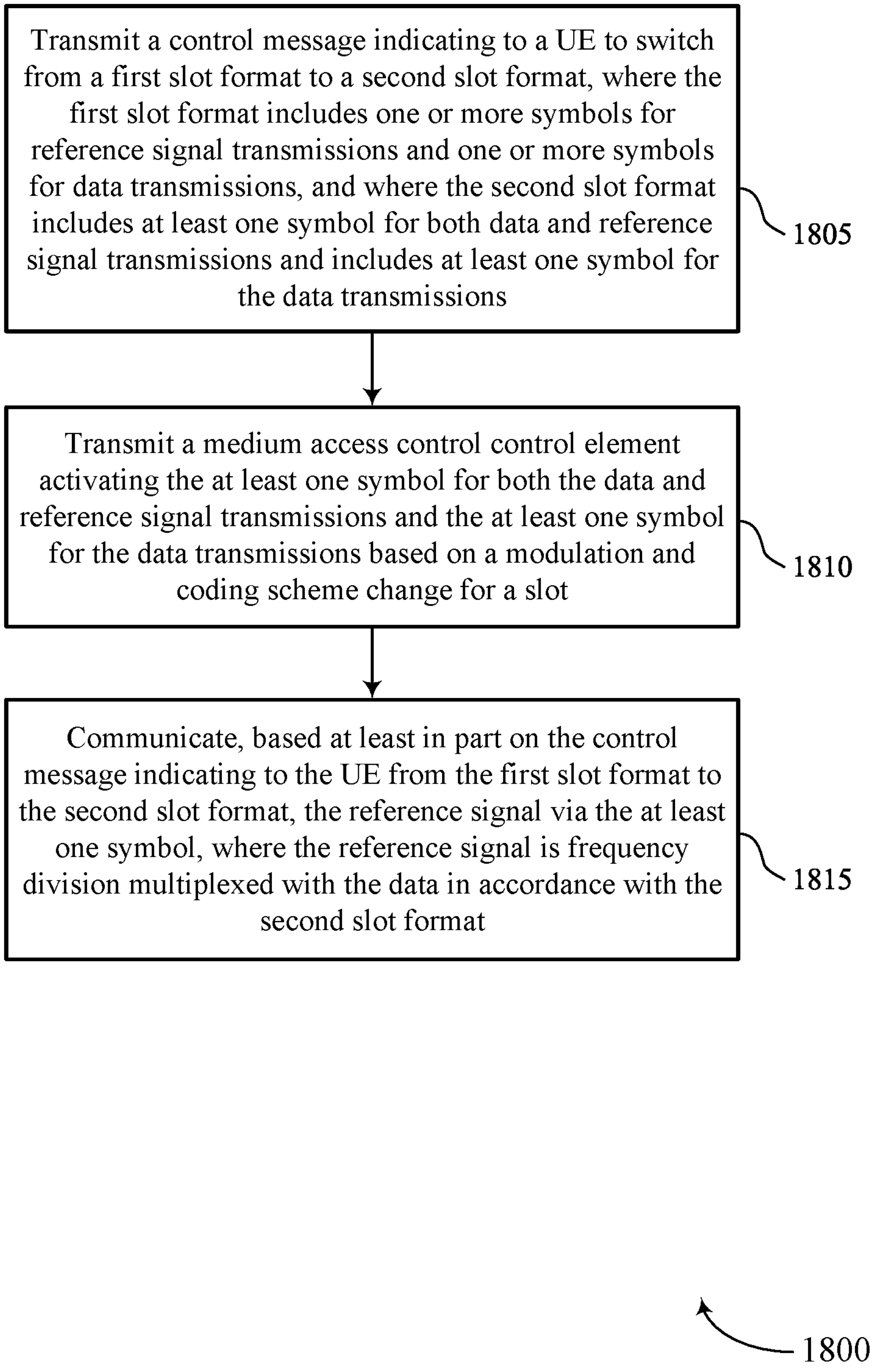

FIG. 18

SLOT FORMAT SWITCHING FOR MULTIPLEXING REFERENCE SIGNALS AND DATA

FIELD OF TECHNOLOGY

The following relates to wireless communications, including slot format switching for multiplexing reference signals and data.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support slot format switching for multiplexing reference signals and data. For example, the described techniques provide for switching from time division multiplexing (TDM)-based slot formats to full frequency division multiplexing (FDM)-based or hybrid TDM/FDM-based slot formats in response to a control message, which may consider a capability and/or a use case of a user equipment (UE). In some examples, a UE receiving a control message indicating that the UE is to switch from a first slot format to a second slot format for transmitting reference signals (e.g., demodulation reference signals (DMRSs), channel state information (CSI) reference signals (CSI-RSs)) and data. The first slot format may include a set of symbols for transmitting reference signals and a set of symbols for transmitting data, which may be TDMed. Thus, the first slot format may be a full-TDM slot format. The second slot format may include at least one symbol in which the UE may FDM the reference signals and the data. That is, the second slot format may be a full-FDM slot format that includes a set of symbols for FDMing the reference signals and the data, or the second slot format may be a hybrid TDM and FDM slot format, which may include at least one symbol for transmitting reference signals, at least one symbol for transmitting data, and at least one symbol for FDMing the reference signals and the data. In some aspects, the UE may transmit a capability message indicating a capability of the UE to switch from the first slot format to the second slot format. Based on the control message, and after switching to the second slot format, the UE may communicate reference signals in accordance with the second slot format.

A method for wireless communications by a UE is described. The method may include receiving a control message indicating to switch from a first slot format to a second slot format, where the first slot format includes one or more symbols for reference signal transmissions and one or more symbols for data transmissions, and where the second slot format includes at least one symbol for FDMing a reference signal and data and communicating, based on the switch from the first slot format to the second slot format, the reference signal via the at least one symbol, where the reference signal is FDMed with the data in accordance with the second slot format.

A UE for wireless communications is described. The UE may include one or more memories storing processor executable code, and one or more processors coupled with the one or more memories. The one or more processors may individually or collectively operable to execute the code to cause the UE to receive a control message indicating to switch from a first slot format to a second slot format, where the first slot format includes one or more symbols for reference signal transmissions and one or more symbols for data transmissions, and where the second slot format includes at least one symbol for FDMing a reference signal and data and communicating, based at least in part on the switch from the first slot format to the second slot format, the reference signal via the at least one symbol, where the reference signal is FDMed with the data in accordance with the second slot format.

Another UE for wireless communications is described. The UE may include means for receiving a control message indicating to switch from a first slot format to a second slot format, where the first slot format includes one or more symbols for reference signal transmissions and one or more symbols for data transmissions, and where the second slot format includes at least one symbol for FDMing a reference signal and data and means for communicating, based on the switch from the first slot format to the second slot format, the reference signal via the at least one symbol, where the reference signal is FDMed with the data in accordance with the second slot format.

A non-transitory computer-readable medium storing code for wireless communications is described. The code may include instructions executable by a processor to receive a control message indicating to switch from a first slot format to a second slot format, where the first slot format includes one or more symbols for reference signal transmissions and one or more symbols for data transmissions, and where the second slot format includes at least one symbol for FDMing a reference signal and data and communicating, based at least in part on the switch from the first slot format to the second slot format, the reference signal via the at least one symbol, where the reference signal is FDMed with the data in accordance with the second slot format.

In some examples of the method, UE, and non-transitory computer-readable medium described herein, the second slot format includes at least one symbol for both data and reference signal transmissions and includes at least one symbol for the data transmissions.

Some examples of the method, UE, and non-transitory computer-readable medium described herein may further include operations, features, means, or instructions for receiving downlink control information (DCI) activating the at least one symbol for both the data and reference signal transmissions and the at least one symbol for the data transmissions, where the second slot format includes at least a first symbol for the data transmissions that may be associated with the UE and a second symbol for both the data and reference signal transmissions that may be associated with a second UE.

Some examples of the method, UE, and non-transitory computer-readable medium described herein may further include operations, features, means, or instructions for receiving a medium access control (MAC) control element (MAC-CE) activating the at least one symbol for both the data and reference signal transmissions and the at least one symbol for the data transmissions based on a modulation and coding scheme (MCS) change for a slot.

In some examples of the method, UE, and non-transitory computer-readable medium described herein, communicating the reference signal may include operations, features, means, or instructions for communicating one or more reference signals via a set of symbols for FDMing the one or more reference signals with the data, where the second slot format includes the set of symbols, and where the set of symbols includes the at least one symbol.

In some examples of the method, UE, and non-transitory computer-readable medium described herein, communicating the one or more reference signals may include operations, features, means, or instructions for communicating a first reference signal via a first symbol for FDMing the first reference signal with the data for the UE and a second reference signal via a second symbol for FDMing the second reference signal with the data for a second UE, where the second slot format includes the first symbol and the second symbol.

In some examples of the method, UE, and non-transitory computer-readable medium described herein, communicating the reference signal may include operations, features, means, or instructions for receiving a first reference signal via a first symbol for the reference signal transmissions in accordance with the first slot format and receiving a second reference signal via the at least one symbol in accordance with the second slot format, where the second reference signal may be FDMed with the data in the at least one symbol.

Some examples of the method, UE, and non-transitory computer-readable medium described herein may further include operations, features, means, or instructions for transmitting a capability message indicating a capability of the UE to switch from the first slot format to the second slot format.

Some examples of the method, UE, and non-transitory computer-readable medium described herein may further include operations, features, means, or instructions for switching from the first slot format to the second slot format based on a capability of the UE to support TDMing the reference signal and the data and FDMing the reference signal and the data, where the second slot format includes at least one symbol for both data and reference signal transmissions and includes at least one symbol for the data transmissions.

Some examples of the method, UE, and non-transitory computer-readable medium described herein may further include operations, features, means, or instructions for switching from the first slot format to the second slot format based on a capability of the UE to support TDMing the reference signal and the data or FDMing the reference signal and the data, where the second slot format includes at least one symbol for both the data and reference signal transmissions.

In some examples of the method, UE, and non-transitory computer-readable medium described herein, the data may be associated with a shared channel and where the reference signal may be a DMRS or a CSI-RS.

A method for wireless communications by a network entity is described. The method may include transmitting a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data and communicating, based on the control message indicating to the UE to switch from the first slot format to the second slot format, the reference signal via the at least one symbol, where the reference signal is FDMed with the data in accordance with the second slot format.

A network entity for wireless communications is described. The network entity may include one or more memories storing processor executable code, and one or more processors coupled with the one or more memories. The one or more processors may individually or collectively operable to execute the code to cause the network entity to transmit a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data and communicating, based at least in part on the control message indicating to the UE to switch from the first slot format to the second slot format, the reference signal via the at least one symbol, where the reference signal is FDMed with the data in accordance with the second slot format.

Another network entity for wireless communications is described. The network entity may include means for transmitting a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data and means for communicating, based on the control message indicating to the UE to switch from the first slot format to the second slot format, the reference signal via the at least one symbol, where the reference signal is FDMed with the data in accordance with the second slot format.

A non-transitory computer-readable medium storing code for wireless communications is described. The code may include instructions executable by a processor to transmit a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data and communicating, based at least in part on the control message indicating to the UE to switch from the first slot format to the second slot format, the reference signal via the at least one symbol, where the reference signal is FDMed with the data in accordance with the second slot format.

In some examples of the method, network entities, and non-transitory computer-readable medium described herein, the second slot format includes at least one symbol for both data and reference signal transmissions and includes at least one symbol for the data transmissions.

Some examples of the method, network entities, and non-transitory computer-readable medium described herein may further include operations, features, means, or instructions for transmitting DCI activating the at least one symbol for both the data and reference signal transmissions and the at least one symbol for the data transmissions, where the second slot format includes at least a first symbol for the data transmissions that may be associated with the UE and a second symbol for both the data and reference signal transmissions that may be associated with a second UE.

Some examples of the method, network entities, and non-transitory computer-readable medium described herein may further include operations, features, means, or instructions for transmitting a MAC-CE activating the at least one symbol for both the data and reference signal transmissions and the at least one symbol for the data transmissions based on an MCS change for a slot.

In some examples of the method, network entities, and non-transitory computer-readable medium described herein, communicating the reference signal may include operations, features, means, or instructions for communicating one or more reference signals via a set of symbols for FDMing the one or more reference signals with the data, where the second slot format includes the set of symbols, and where the set of symbols includes the at least one symbol.

In some examples of the method, network entities, and non-transitory computer-readable medium described herein, communicating the one or more reference signals may include operations, features, means, or instructions for communicating a first reference signal via a first symbol for FDMing the first reference signal with the data for the UE and a second reference signal via a second symbol for FDMing the second reference signal with the data for a second UE, where the second slot format includes the first symbol and the second symbol.

In some examples of the method, network entities, and non-transitory computer-readable medium described herein, communicating the reference signal may include operations, features, means, or instructions for transmitting a first reference signal via a first symbol for the reference signal transmissions in accordance with the first slot format and transmitting a second reference signal via the at least one symbol in accordance with the second slot format, where the second reference signal may be FDMed with the data in the at least one symbol.

Some examples of the method, network entities, and non-transitory computer-readable medium described herein may further include operations, features, means, or instructions for receiving a capability message indicating a capability of the UE to switch from the first slot format to the second slot format.

In some examples of the method, network entities, and non-transitory computer-readable medium described herein, the capability message indicates a capability of the UE to support TDMing the reference signal and the data and FDMing the reference signal and the data, and where the second slot format includes at least one symbol for both data and reference signal transmissions and includes at least one symbol for the data transmissions.

In some examples of the method, network entities, and non-transitory computer-readable medium described herein, the capability message indicates a capability of the UE to support TDMing the reference signal and the data or FDMing the reference signal and the data, and where the second slot format includes at least one symbol for both the data and reference signal transmissions.

In some examples of the method, network entities, and non-transitory computer-readable medium described herein, the data may be associated with a shared channel and where the reference signal may be a DMRS or a CSI-RS.

BRIEF DESCRIPTION OF THE DRAWINGS

FIGS. 13 through 18 show flowcharts illustrating methods that support slot format switching for multiplexing reference signals and data in accordance with one or more aspects of the present disclosure.

DETAILED DESCRIPTION

Figure 1:
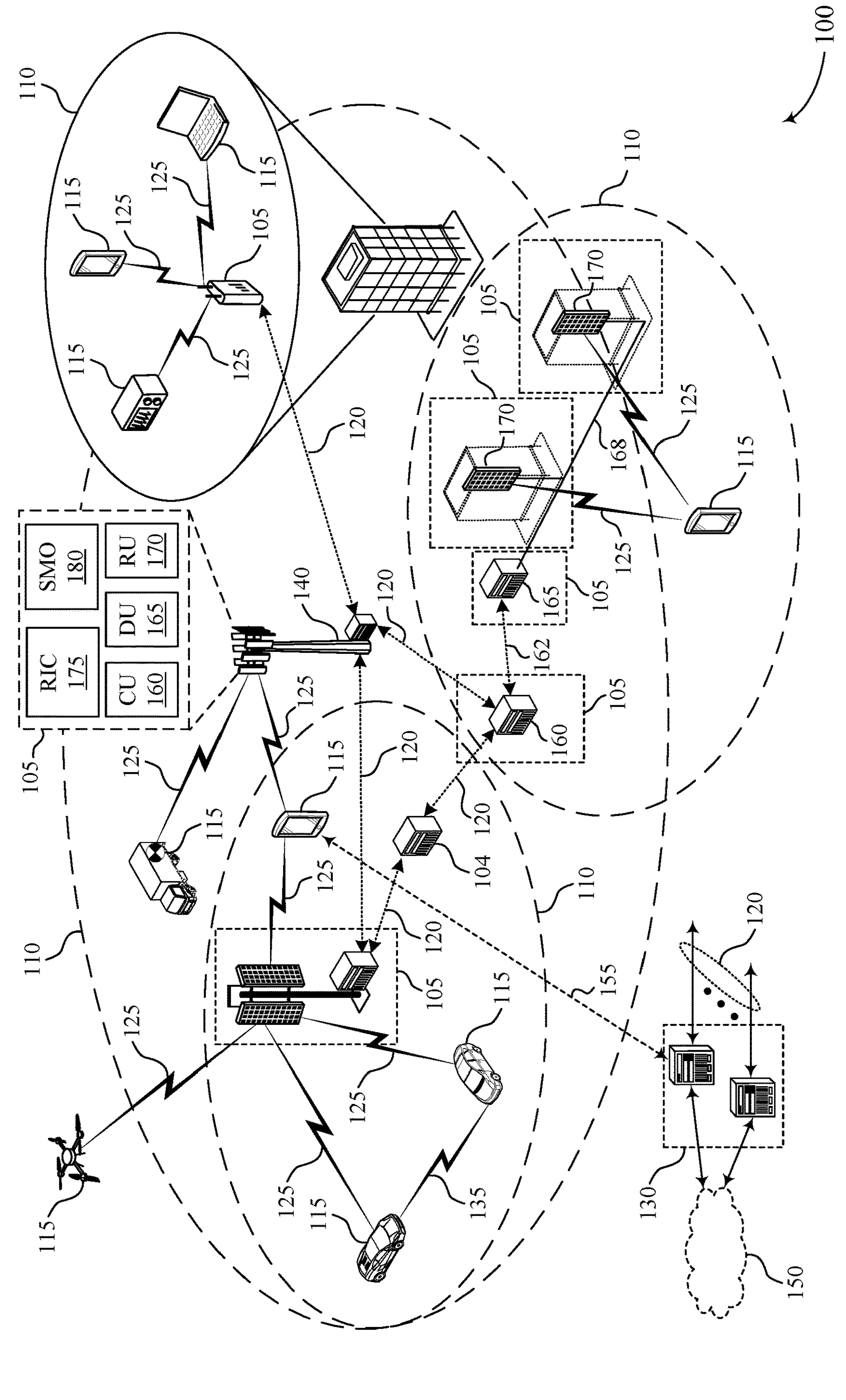
FIG. 1 shows an example of a wireless communications system that supports slot format switching for multiplexing reference signals and data in accordance with one or more aspects of the present disclosure.

A wireless communications system may support discrete Fourier transform (DFT)-spread-orthogonal frequency division multiplexing (DFT-s-OFDM) waveforms, which may allow a transmitter to utilize time division multiplexing (TDM) of reference signals and data. In some examples, a user equipment (UE) may benefit from using a full frequency bandwidth of a slot to transmit reference signals (e.g., demodulation reference signals (DMRSs)) for channel estimation, and thus, the UE may TDM reference signals and data in a slot. Alternatively, the UE may utilize a portion of a full bandwidth, and as such, may reduce overhead by FDMing reference signals and data in a slot. In a multi-user system, multiple UEs that communicate using a same slot may FDM respective reference signals and data in respective symbols of the slot. Thus, FDMing reference signals and data across an entire slot may reduce channel estimation performance as a UE may be limited to transmitting fewer reference signals.

The techniques described herein support slot format switching for multiplexing (e.g., TDM, FDM) reference signals and data. Depending on a use case and a capability of a UE, the UE may benefit from TDMing reference signals and data in some symbols of a slot and FDMing reference signals and data in other symbols of the slot. Accordingly, a wireless communications system may support hybrid TDM and FDM slot patterns or formats for multiplexing reference signals and data within a slot for a DFT-s-OFDM waveform. For example, based on a particular slot format, a UE may switch from a full-TDM slot format (in which the UE may TDM reference signals and data) to a full-FDM slot format (in which the UE may FDM reference signals and data) or a hybrid TDM and FDM slot format (in which the UE may use TDM or FDM in particular symbols of the slot) to accommodate different use cases.

In some examples, the UE may receive a control message indicating that the UE is to switch from a first slot format to a second slot format for transmitting reference signals (e.g., DMRSs) and data. The first slot format may include a set of one or more symbols for transmitting reference signals and a set of symbols for transmitting data, which may be TDMed. Thus, the first slot format may be a full-TDM slot format. The second slot format may include at least one symbol in which the UE may FDM the reference signals and the data. That is, the second slot format may be a full-FDM slot format that includes a set of one or more symbols for FDMing the reference signals and the data, or the second slot format may be a hybrid TDM and FDM slot format, which may include at least one symbol for transmitting reference signals, at least one symbol for transmitting data, and at least one symbol for FDMing the reference signals and the data. In some aspects, the UE may transmit a capability message indicating a capability of the UE to switch from the first slot format to the second slot format. Based on the control message, and after switching to the second slot format, the UE may communicate reference signals in accordance with the second slot format.

Aspects of the disclosure are initially described in the context of wireless communications systems. Aspects of the disclosure are then described in the context of slot format switching patterns and process flows. Aspects of the disclosure are further illustrated by and described with reference to apparatus diagrams, system diagrams, and flowcharts that relate to slot format switching for multiplexing reference signals and data.

FIG. 1 shows an example of a wireless communications system 100 that supports slot format switching for multiplexing reference signals and data in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support slot format switching for multiplexing reference signals and data as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term “carrier” may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms “transmitting,” “receiving,” or “communicating,” when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a “system bandwidth” of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of TDM techniques, FDM techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHZ.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UE 115 and the network entity 105 may support FDMing reference signals (such as DMRSs) with data channels (e.g., PUSCH, PDSCH) to improve signaling throughput. For example, cyclic prefix OFDM (CP-OFDM)-based waveforms may allow multiplexing of reference signals with a PDSCH or a PUSCH in the frequency domain within a same symbol. A particular PDSCH or PUSCH DMRS configuration (e.g., Type 1 or Type 2) may define different DMRS resource element densities for the symbol. In some examples, DFT-s-OFDM-based waveforms may allow multiplexing in the frequency domain (e.g., FDMing a phase-tracking reference signal (PTRS) and data), however this may result in a peak-to-average power ratio (PAPR) loss.

FDMing reference signals (e.g., DMRS) and data may benefit the UE 115 and the network entity 105 in different use cases, particularly for DFT-s-OFDM waveforms. For example, a frequency-domain DMRS (i.e., a post-DFT DMRS), may result in low-complexity channel estimation and equalization. In addition, FDMing DMRSs and data (e.g., in high doppler scenarios) may result in overhead reduction. However, current techniques may enable the network entity 105 to configure dedicated DMRS symbols such that the DMRSs may be TDMed with the data instead of FDMed. In cases in which there may be a high signal-to-noise ratio (SNR) operating point, FDMing DMRSs and data may result in overhead reduction such that the UE 115 may achieve improved channel estimation performance with less overhead.

In some examples, FDMing reference signals (e.g., DMRSs) and data for DFT-s-OFDM waveforms may depend on whether the UE 115 has access to pre-DFT precoded data samples, pre-DFT precoded reference signals, or both. That is, whether DFT precoding is performed on reference signal samples may result in different FDM techniques. For example, if the reference signals are pre-DFT precoded (i.e., not DFT precoded), the reference signals and data may be directly FDMed without puncturing, which may span the entire frequency allocation for a given UE 115 or other user device. However, such cases may require changing DFT sizes each time it performs the FDMing, which may increase overhead and power consumption. Alternatively, for example for binary phase-shift keying (BPSK)-modulated reference signal samples, the network entity 105 may perform pre-DFT multiplexing of the reference signals and the data with two narrow-band DFTs. However, such techniques may be highly-complex as there may be a variable DFT size for both the reference signals and the data.

For each of these FDMing techniques, the network entity 105 (e.g., a transmitter) may perform a frequency mapping between reference signals and the data (one or both of which may be pre-DFT precoded), a subcarrier mapping, and an inverse fast Fourier transform (IFFT) to output multiplexed reference signals and data. The UE 115 (e.g., a receiver) may perform a frequency de-mapping of the reference signals and data to obtain each. In some examples, if there is a DMRS (reference signal) density of less than or equal to 50% (i.e., there are fewer DMRS than data samples or the same amount of DMRSs and data samples), each 1/ρ tone may be a DMRS tone, where ρ may represent the DMRS density (i.e., a density of DMRSs allocated in the frequency domain). That is, there may be a total of $N_p$ DMRS tones and $M-N_p=N_d$ data tones, where M may represent a total quantity of reference signal resource elements. The reference signals resource elements may either be DFT-precoded (in which case, the network entity 105 may perform pre-DFT multiplexing of the reference signals and the data with two narrowband DFTs), or non-DFT-precoded (e.g., direct-insertion, in which case the network entity 105 may FDM the reference signals and the data without puncturing). Thus, if ρ=33%, every third tone may be a DMRS tone (e.g., Data [1], Data [2], reference signal (RS) [1], Data [3], Data [4], RS [2], and so on).

If the DMRS density ρ is greater than 50%, the frequency mapping between the reference signals and the data may result in every $$\frac{1}{1-\rho}$$

tone being a data tone with a total quantity of $N_d$ data tones and $M-N_d=N_p$ DMRS tones. For example, if ρ=66%, every third tone may be a data tone (e.g., RS [1], RS [2], Data [1], RS [3], RS [4], Data [2], and so on). In some examples, a PAPR of a waveform may depend on a type of sequence (e.g., quadrature phase-shift keying (QPSK), quadrature amplitude modulation (QAM)) used for FDMing the reference signals and the data and on ρ.

The wireless communications system 100 may support slot format switching for multiplexing (e.g., TDM, FDM) reference signals and data. Depending on a use case and a capability of a UE 115, the UE 115 may benefit from TDMing reference signals and data in some symbols of a slot and FDMing reference signals and data in other symbols of the slot. Accordingly, a wireless communications system may support hybrid TDM and FDM slot patterns or formats for multiplexing reference signals and data within a slot for a DFT-s-OFDM waveform.

In some examples, the UE 115 may receive a control message indicating that the UE 115 is to switch from a first slot format to a second slot format for transmitting reference signals (e.g., DMRSs) and data. The first slot format may include a set of one or more symbols for transmitting reference signals and a set of one or more symbols for transmitting data, which may be TDMed. Thus, the first slot format may be a full-TDM slot format. The second slot format may include at least one symbol in which the UE 115 may FDM the reference signals and the data. That is, the second slot format may be a full-FDM slot format that includes a set of symbols for FDMing the reference signals and the data, or the second slot format may be a hybrid TDM and FDM slot format, which may include at least one symbol for transmitting reference signals, at least one symbol for transmitting data, and at least one symbol for FDMing the reference signals and the data. In some aspects, the UE 115 may transmit a capability message indicating a capability of the UE 115 to switch from the first slot format to the second slot format, the switching based on the control message. Based on the control message, and after switching to the second slot format, the UE 115 may communicate reference signals in accordance with the second slot format.

Figure 2:
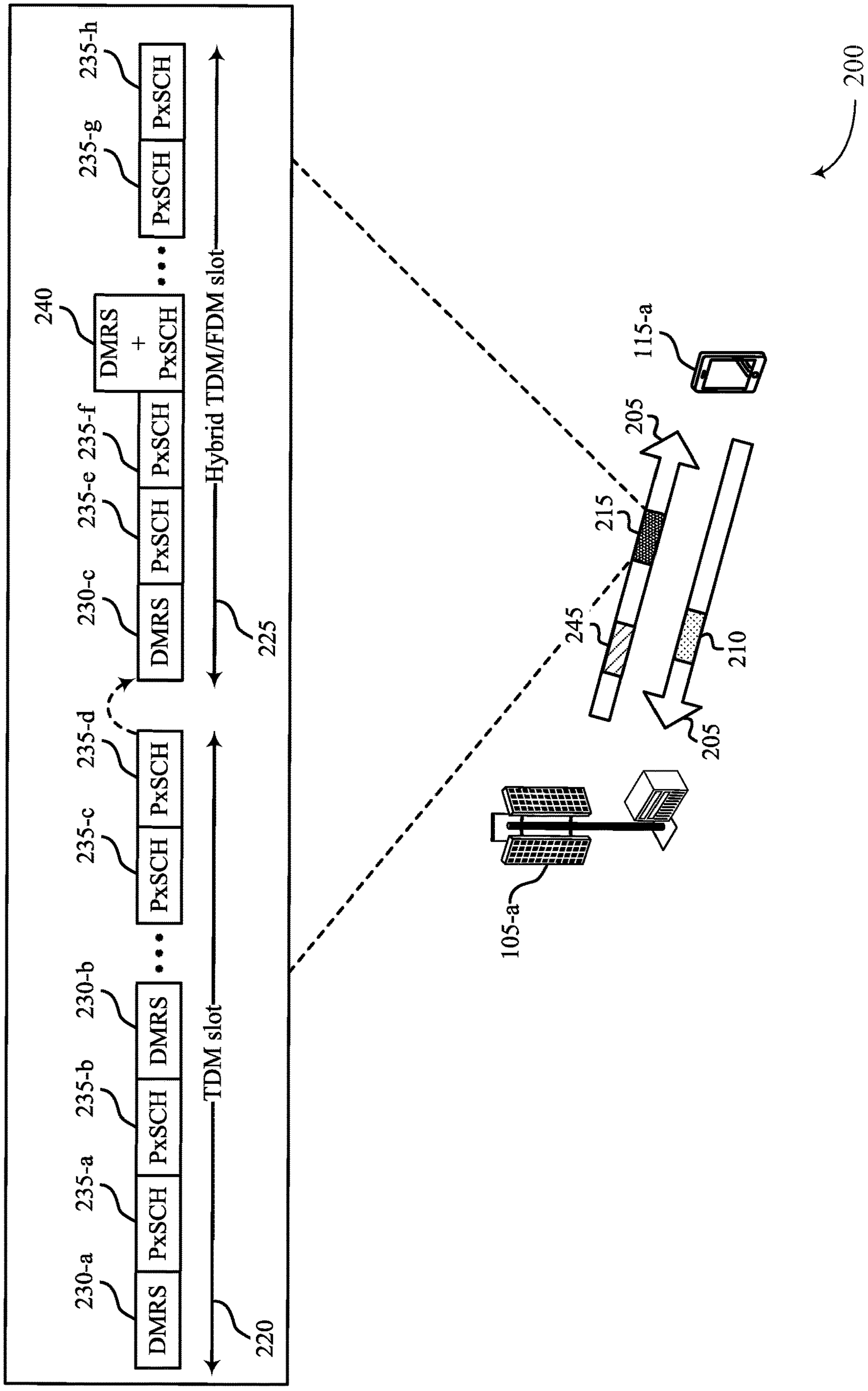
FIG. 2 shows an example of a wireless communications system that supports slot format switching for multiplexing reference signals and data in accordance with one or more aspects of the present disclosure.

FIG. 2 shows an example of a wireless communications system 200 that supports slot format switching for multiplexing reference signals and data in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a network entity 105-*a* (e.g., a base station, a gNB), which may be examples of corresponding devices described herein. The UE 115-*a* and the network entity 105-*a* may support multiple slot formats that provide symbols for TDMing reference signals (e.g., DMRSs or CSI-RSs) and data (e.g., physical downlink shared channel (PDSCH) or physical uplink shared channel (PUSCH) transmissions, also referred to herein as PxSCH transmissions), FDMing the reference signals and the data, or both.

The wireless communications system 200 may support communications between the UE 115-*a* and the network entity 105-*a*. For example, the UE 115-*a* and the network entity 105-*a* may communicate uplink and downlink messages via respective communication links 205, which may examples of a communication link 125 described herein with reference to FIG. 1. To reduce overhead and reduce complexity associated with multiplexing reference signals and data for DFT-s-OFDM waveforms, the UE 115-*a* and the network entity 105-*a* may support multiplexing (e.g., TDMing and FDMing) of reference signals (e.g., DMRSs or CSI-RSs) and data based on specific slot formats configured for the UE 115-*a*.

The described techniques may be employed in high-doppler scenarios and in systems with high-operating SNR points. Additionally, or alternatively, the described techniques may be beneficial in cases where there may be an allocation of dedicated reference signals for non-linear power amplifier (NLPA) compensation at a receiver (e.g., one DMRS for linear channel estimation that may be FDMed with data and one full reference signal for NLPA compensation at the receiver that may be FDMed with data). In some aspects, the described techniques may benefit multi-user MIMO (MU-MIMO) scenarios in which multiple UEs 115 or other users within a downlink slot may each have their own DMRS FDMed with data.

To support TDMing and FDMing of the DMRSs and the data, the network entity 105-*a* may configure the UE 115-*a* to switch from a first slot format to a second slot format. In some examples, the UE 115-*a* may transmit capability message 210 to the network entity 105-*a* indicating a capability of the UE 115-*a* to support processing of a switch between TDM and FDM DMRS processing (i.e., between the first slot format and the second slot format). The network entity 105-*a* may configure the UE 115-*a* to switch from a first slot format, which may correspond to a TDM slot 220, to a second slot format, which may correspond to a hybrid TDM/FDM slot 225. For example, the network entity 105-*a* may transmit a control message 215 indicating the switch.

In some examples, the TDM slot 220 may include one or more symbols for reference signal transmissions (DMRS symbols 230) and one or more symbols for data transmissions (data symbols 235), such that reference signals and data may be TDMed in the TDM slot 220. For example, the TDM slot 220 may include DMRS symbols 230-*a* and 230-*b* and data symbols 235-*a*, 235-*b*, 235-*c*, and 235-*d*. In some cases, the TDM slot 220 may include additional DMRS symbols 230, data symbols 235, or both. The hybrid TDM/FDM slot 225 may include at least one symbol for FDMing a reference signal and data. For example, the hybrid TDM/FDM slot 225 may include a DMRS symbol 230-*c* for transmitting DMRSs or other reference signals, data symbols 235-*e*, 235-*f*, 235-*g*, and 235-*h* for transmitting data, and an FDM symbol 240 for FDMing reference signals and data (e.g., DMRSs and PxSCH). That is, the FDM symbol 240 may be used for both data and reference signal transmissions, and the data symbols 235 may be used for data transmissions and not reference signal transmissions. The hybrid TDM/FDM slot 225 may include additional DMRS symbols 230, data symbols 235, FDM symbols 240, or any combination thereof. In some examples, the network entity 105-*a* may indicate that the UE 115-*a* is to switch to an FDM slot (a full-FDM slot) that supports FDMing (and not TDMing) of the reference signals and data, which is described herein with reference to FIG. 3.

Depending on a use case and requirements of the UE 115-*a*, the switching may be dynamic (e.g., indicated via downlink control information (DCI) or in cases where another UE indicates the switch, uplink control information (UCI)), semi-static (e.g., indicated via a MAC control element (MAC-CE)), or static (e.g., indicated via an RRC message). For example, the UE 115-*a* may receive an RRC message, which may include one or more information elements that indicate whether the UE 115-*a* is to use the TDM slot 220 or switch to (e.g., activate) the hybrid TDM/FDM slot 225. Based on the hybrid TDM/FDM slot 225 being activated, the UE 115-*a* may receive DCI which may activate specific symbols of the hybrid TDM/FDM slot for TDMing or hybrid TDMing/FDMing reference signals and data. In such cases, the DCI may include explicit indications of which specific symbols to activate. For example, the UE 115-*a* may receive DCI indicating (and thus, activating) the FDM symbol 240 (e.g., at least one symbol for both data and reference signal transmissions) and at least one data symbol 235 (e.g., at least one symbol for the data transmissions) of the hybrid TDM/FDM slot 225. In MU-MIMO scenarios (with DFT-s-OFDM waveforms), the switching may be dynamic based on DCI, where the at least one data symbol 235 (e.g., a TDM symbol) is associated with the UE 115-*a* and the FDM symbol 240 is associated with a second UE 115. That is, individual symbols of the hybrid TDM/FDM slot 225 may be used by different UEs 115 for TDMing or FDMing reference signals and data.

In some examples, there may be a change of modulation and coding scheme (MCS) within a slot. For example, a first set of one or more symbols within the TDM slot 220 may correspond to a first MCS (e.g., MCS 1, which may correspond to QPSK and require a low SNR operating point) and a second set of one or more symbols within the TDM slot 220 may correspond to a second MCS (e.g., MCS 5, which may be used for link-adaptation purposes and may require a higher SNR operating point for clean channel estimation). In such cases, to perform channel estimation, the UE 115-*a* may use FDM reference signals and data in the first set of symbols based on the first MCS and the UE 115-*a* may use TDM reference signals and data in the second set of symbols based on the second MCS (e.g., allocate a full DMRS symbol 230 for a DMRS to have a clean channel estimation). That is, the UE 115-*a* may receive a MAC-CE activating the FDM symbol 240 and at least one data symbol 235 of the hybrid TDM/FDM slot 225 based on an MCS change for the TDM slot 220.

Based on receiving a control message (e.g., RRC, DCI, or MAC-CE) indicating to switch from the first slot format to the second slot format, and based on a capability of the UE 115-*a*, the UE 115-*a* may switch from the first slot format to the second slot format. For example, if the UE 115-*a* supports TDMing of the DMRSs and data in DMRS symbols 230 and data symbols 235 and FDMing of the DMRSs and the data in the FDM symbol 240, the UE 115-*a* may switch from the TDM slot 220 to the hybrid TDM/FDM slot 225.

The UE 115-*a* may communicate one or more reference signals 245 (e.g., DMRSs, CSI-RSs) via at least the FDM symbol 240 based on the switch from the first slot format to the second slot format (i.e., from the TDM slot 220 to the hybrid TDM/FDM slot 225). In this way, a reference signal 245 may be FDMed with data (e.g., PxSCH) in accordance with the second slot format. In some examples, the UE 115-*a* may communicate the reference signals 245 depending on an active slot format. For example, the UE 115-*a* may receive a first reference signal (e.g., a first DMRS) via a DMRS symbol 230 of the TDM slot 220 according to the first slot format and a second reference signal (e.g., a second DMRS) via the FDM symbol 240 of the hybrid TDM/FDM slot 225 according to the second slot format, where the second reference signal is FDMed with data in the FDM symbol 240.

Switching to the hybrid TDM/FDM slot 225 (corresponding to the second slot format) in this way may result in a distribution of multiple TDMed DMRS symbols 230 into a hybrid of TDMed and FDMed DMRS symbols 230 (e.g., the DMRS symbol 230-*c*, which may support TDMed reference signals and data, and the FDM symbol 240, which may support FDMed reference signals and data) which may reduce signaling overhead. In addition, the hybrid TDMed and FDMed DMRS symbols 230 supported by the hybrid TDM/FDM slot 225 may improve tracking of time-varying channels with reasonable overhead. Additionally, if multiple UEs 115 served by a downlink in a slot, the hybrid TDM/FDM slot 225 may allow different UEs 115 to utilize different TDM or FDM patterns, such that different symbols may be used for TDMing or FDMing reference signals and data for different UEs.

Figure 3:
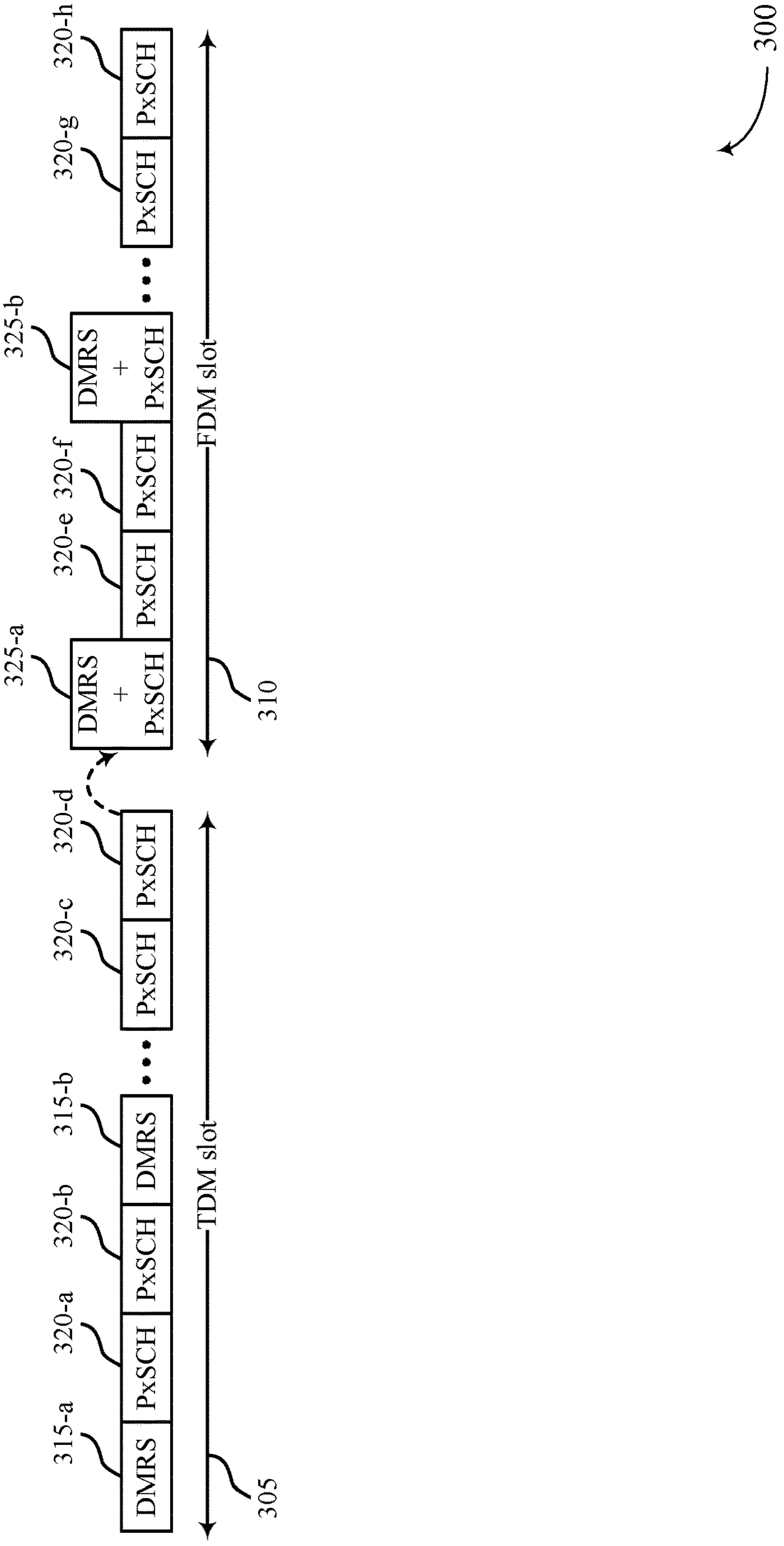
FIG. 3 shows an example of a slot format switching pattern that supports slot format switching for multiplexing reference signals and data in accordance with one or more aspects of the present disclosure.

FIG. 3 shows an example of a slot format switching pattern 300 that supports slot format switching for multiplexing reference signals and data in accordance with one or more aspects of the present disclosure. In some examples, the slot format switching pattern 300 may implement aspects of the wireless communications systems 100 and 200 or may be implemented by aspects of the wireless communications systems 100 and 200. For example, as described with reference to FIG. 2, a UE 115-*a* and a network entity 105-*a* (e.g., a base station, a gNB) may support multiple slot formats that provide symbols for TDMing reference signals (e.g., DMRSs or CIS-RSs) and data (e.g., PDSCH and PUSCH, also referred to herein as PxSCH), FDMing the reference signals and the data, or both. As depicted in FIG. 3, a first slot format may correspond to a full TDM slot (a TDM slot 305) and a second slot format may correspond to a full FDM slot (an FDM slot 310).

To reduce overhead and reduce complexity associated with multiplexing reference signals and data for DFT-s-OFDM waveforms, the UE 115-*a* and the network entity 105-*a* may support multiplexing (e.g., TDMing and FDMing) of reference signals (e.g., DMRSs or CSI-RSs) and data based on specific slot formats configured for the UE 115-*a*. As described herein with reference to FIG. 2, the network entity 105-*a* may configure the UE 115-*a* to switch from a first slot format to a second slot format. In some examples, the UE 115-*a* may support switching between full TDM and full FDM DMRS processing (i.e., between the first slot format and the second slot format, however the UE 115-*a* may lack support for TDM and FDM processing within a same slot). The network entity 105-*a* may configure (e.g., via a control message) the UE 115-*a* to switch from a first slot format, which may correspond to a TDM slot 305, to a second slot format, which may correspond to an FDM slot 310.

In some examples, the TDM slot 305 may include one or more symbols for reference signal transmissions (DMRS symbols 315) and one or more symbols for data transmissions (data symbols 320), such that reference signals and data may be TDMed in the TDM slot 305. For example, the TDM slot 305 (i.e., a full TDM slot) may include DMRS symbols 315-*a* and 315-*b* and data symbols 320-*a*, 320-*b*, 320-*c*, and 320-*d*. In some cases, the TDM slot 305 may include additional DMRS symbols 315, data symbols 320, or both. The FDM slot 310 (i.e., a full FDM slot) may include at least one symbol for FDMing a reference signal and data. For example, the FDM slot 310 may include data symbols 320-*c*. 320-*f*, 320-*g*, and 320-*h* for transmitting data and FDM symbols 325-*a* and 325-*b* for FDMing reference signals and data (e.g., DMRSs and PxSCH). That is, the FDM symbols 325 may be used for both data and reference signal transmissions, and the data symbols 320 may be used for data transmissions and not reference signal transmissions. The FDM slot 310 may include additional data symbols 320, FDM symbols 325, or both.

As described herein, the UE 115-*a* may switch from the first slot format to the second slot format in a dynamic, semi-static, or static manner depending on a use case and requirements of the UE 115-*a*. For example, the UE 115-*a* may receive an RRC message activating the FDM slot 310 followed by DCI or a MAC-CE activating specific symbols of the FDM slot 310 as FDM symbols 325 (for FDMing reference signals and data) or data symbols 320 (for transmitting data). In MU-MIMO scenarios (with DFT-s-OFDM waveforms), the switching may be dynamic based on DCI, where the FDM symbol 325-*a* may be associated with the UE 115-*a* and the FDM symbol 325-*b* may be associated with a second UE 115 such that the UEs 115 may FDM their own reference signals and data in respective symbols of the FDM slot 310. Additionally, or alternatively, if there is a change of MCS within a slot (e.g., the TDM slot 305), the UE 115-*a* may receive a MAC-CE activating at least one of the FDM symbols 325 of the FDM slot 310.

Based on receiving a control message (e.g., RRC, DCI, or MAC-CE) indicating to switch from the first slot format to the second slot format, and based on a capability of the UE 115-*a* to support switching from a full TDM slot to a full FDM slot, the UE 115-*a* may switch from the first slot format to the second slot format. For example, if the UE 115-*a* supports TDMing of the DMRSs and the data in DMRS symbols 315 and data symbols 320 or FDMing of the DMRSs and the data in the FDM symbols 325, the UE 115-*a* may switch from the TDM slot 305 to the FDM slot 310.

The UE 115-*a* may communicate one or more reference signals (e.g., DMRSs, CSI-RSs) via at least one of the FDM symbols 325 based on the switch from the first slot format to the second slot format (i.e., from the TDM slot 305 to the FDM slot 310). In this way, a reference signal may be FDMed with data (e.g., PxSCH) in accordance with the second slot format, and the UE 115-*a* may refrain from performing TDMing of the reference signals and the data in the FDM slot 310.

Switching to the FDM slot 310 (corresponding to the second slot format) in this way may result in a distribution of multiple TDMed DMRS symbols 230 into a set of FDMed DMRS symbols 230 (e.g., the FDM symbols 325, which may support FDMed reference signals and data) which may reduce signaling overhead. In addition, the FDM symbols 325 supported by the FDM slot 310 may improve tracking of time-varying channels with reasonable overhead (e.g., one FDMed symbol may reduce overhead, two or more FDMed symbols may improve the tracking of time-varying channels). Additionally, if multiple UEs 115 served by a downlink in a slot, the FDM slot 310 may allow different UEs 115 to utilize different FDM patterns such that each UE 115 may have their own reference signals FDMed with data in specific symbols of the FDM slot 310.

Figure 4:
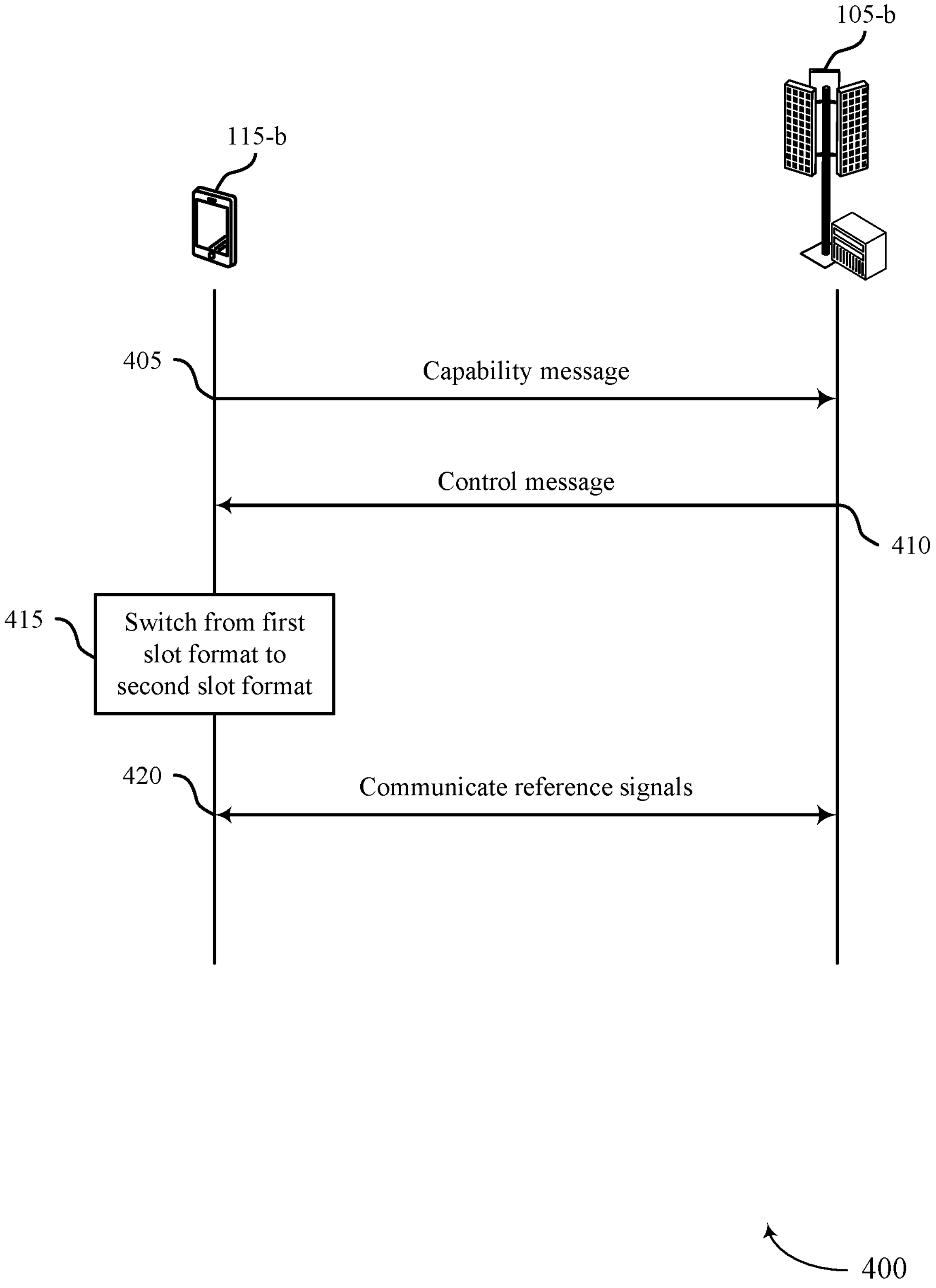
FIG. 4 shows an example of a process flow that supports slot format switching for multiplexing reference signals and data in accordance with one or more aspects of the present disclosure.

FIG. 4 shows an example of a process flow 400 that supports slot format switching for multiplexing reference signals and data in accordance with one or more aspects of the present disclosure. The process flow 400 may implement aspects of wireless communications systems 100 and 200, or may be implemented by aspects of the wireless communications system 100 and 200. For example, the process flow 400 may illustrate operations between a UE 115-*b* and a network entity 105-*b*, which may be examples of corresponding devices described herein. In the following description of the process flow 400, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 400, and other operations may be added to the process flow 400.

At 405, the UE 115-*b* may transmit, to the network entity 105-*b*, a capability message indicating a capability of the UE 115-*b* to switch from a first slot format to a second slot format (the switching based on receiving a control message from the network entity 105-*b*). The first slot format may include one or more symbols for reference signal transmissions (e.g., DMRS, CSI-RS) and one or more symbols for data transmissions (e.g., PDSCH, PUSCH), and the second slot format may include at least one symbol for FDMing a reference signal and data. As such, the capability message may indicate a capability of the UE 115-*b* to switch from a full TDM slot to a hybrid TDM/FDM slot or a full FDM slot.

At 410, the UE 115-*b* may receive, from the network entity 105-*b*, a control message indicating to switch from the first slot format to the second slot format. In some examples, the control message may include an RRC message that activates the second slot format (e.g., corresponding to a full FDM slot or a hybrid TDM/FDM slot) and DCI or a MAC-CE activating one or more symbols of the second slot format for FDMing reference signals and data. That is, the control message may include the RRC message that activates the second slot format and the DCI or a MAC-CE activating one or more symbols of the second slot format for FDMing reference signals and data together. In some examples, the symbols may correspond to specific UEs 115, such that multiple UEs 115 may multiplex their own reference signals with data over respective symbols.

At 415, the UE 115-*b* may switch from the first slot format to the second slot format based on the capability of the UE 115-*b* to support TDMing the reference signals and data and/or FDMing the reference signals and data. For example, if the UE 115-*b* supports TDMing and FDMing the reference signals and data in a slot, the UE 115-*b* may switch to a hybrid TDM/FDM slot. Alternatively, if the UE 115-*b* supports TDMing or FDMing the reference signals and data in a slot, the UE 115-*b* may switch to a full FDM slot.

At 420, the UE 115-*b* may communicate with the network entity 105-*b* (e.g., transmit and receive messages) the reference signal via the at least one symbol based on the switch from the first slot format to the second slot format. The reference signal is FDMed with the data in accordance with the second slot format. In some examples, the UE 115-*b* may receive some reference signals that are TDMed with data and some reference signals that are FDMed with data.

Figure 5:
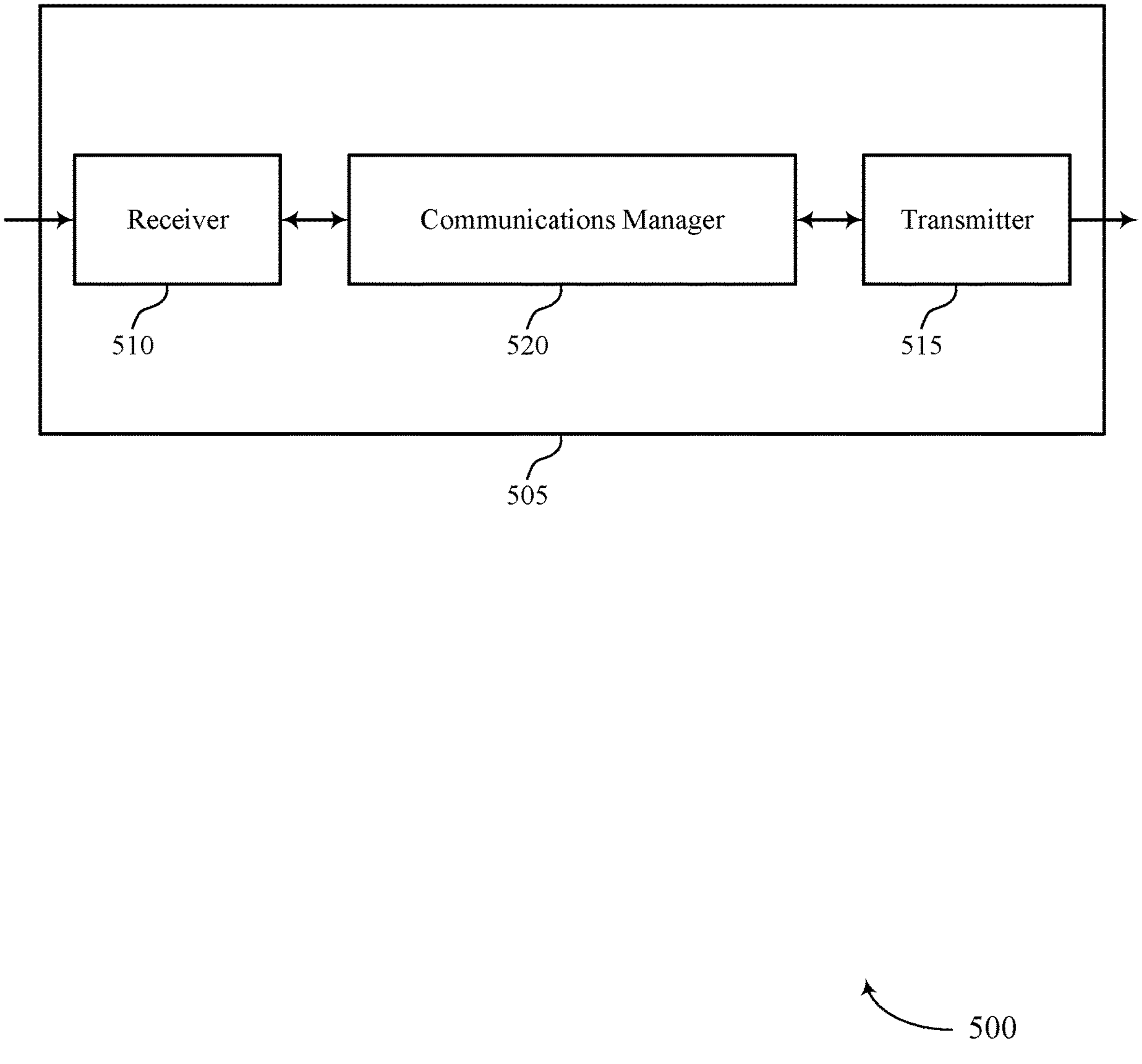
FIGS. 5 and 6 show block diagrams of devices that support slot format switching for multiplexing reference signals and data in accordance with one or more aspects of the present disclosure.

FIG. 5 shows a block diagram 500 of a device 505 that supports slot format switching for multiplexing reference signals and data in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to slot format switching for multiplexing reference signals and data). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to slot format switching for multiplexing reference signals and data). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of slot format switching for multiplexing reference signals and data as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a control message indicating to switch from a first slot format to a second slot format, where the first slot format includes one or more symbols for reference signal transmissions and one or more symbols for data transmissions, and where the second slot format includes at least one symbol for FDMing a reference signal and data. The communications manager 520 is capable of, configured to, or operable to support a means for communicating, based at least in part on the switch from the first slot format to the second slot format, the reference signal via the at least one symbol, where the reference signal is FDMed with the data in accordance with the second slot format.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for slot format switching for multiplexing reference signals and data, which may reduce overhead, increase signaling throughput, reduce processing, improve utilization of communication resources, improve channel estimation performance, and improve tracking of time-varying channels.

Figure 6:
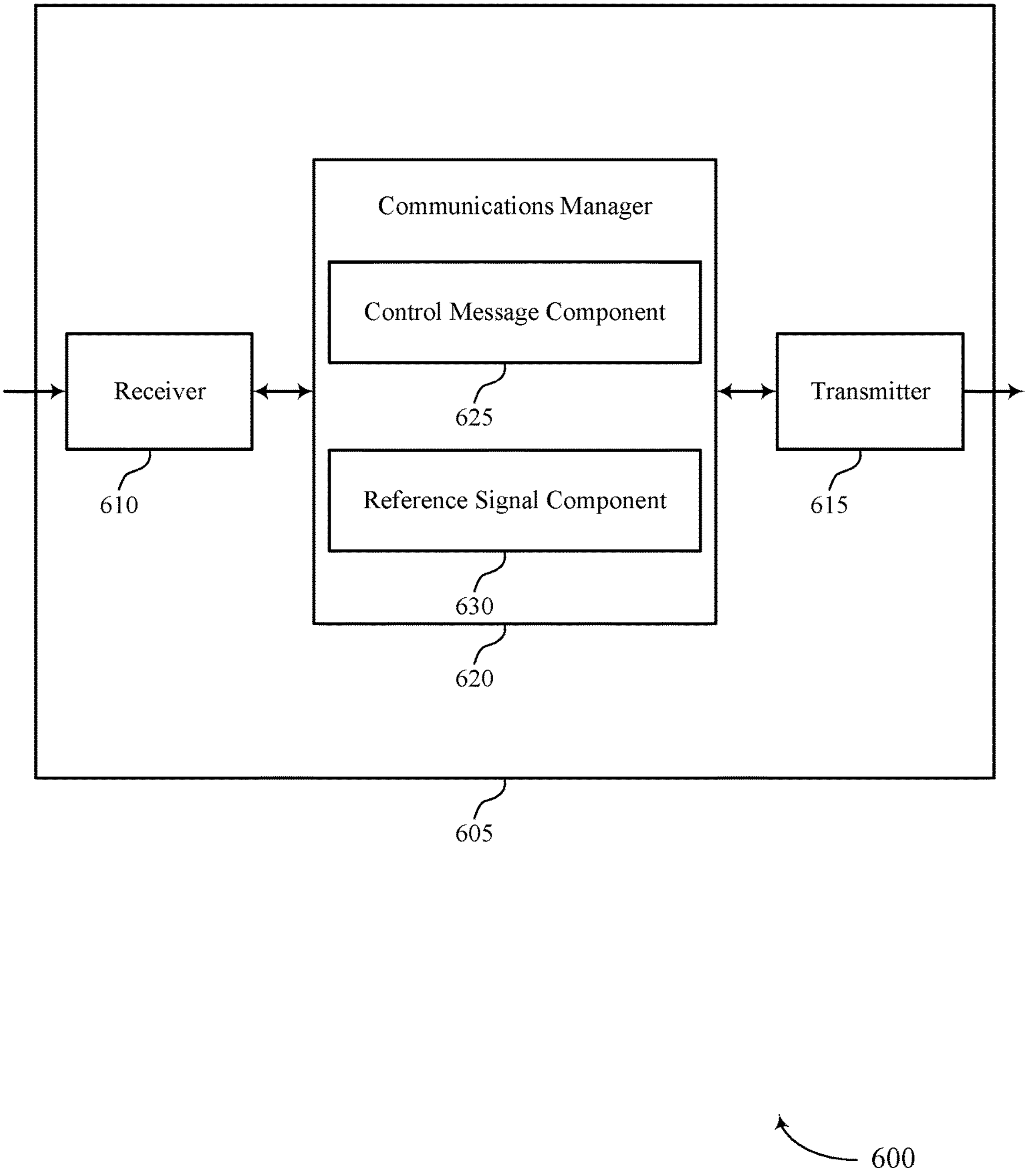

FIG. 6 shows a block diagram 600 of a device 605 that supports slot format switching for multiplexing reference signals and data in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to slot format switching for multiplexing reference signals and data). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to slot format switching for multiplexing reference signals and data). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of slot format switching for multiplexing reference signals and data as described herein. For example, the communications manager 620 may include a control message component 625, a reference signal component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The control message component 625 is capable of, configured to, or operable to support a means for receiving a control message indicating to switch from a first slot format to a second slot format, where the first slot format includes one or more symbols for reference signal transmissions and one or more symbols for data transmissions, and where the second slot format includes at least one symbol for FDMing a reference signal and data. The reference signal component 630 is capable of, configured to, or operable to support a means for communicating, based on the switch from the first slot format to the second slot format, the reference signal via the at least one symbol, where the reference signal is FDMed with the data in accordance with the second slot format.

Figure 7:
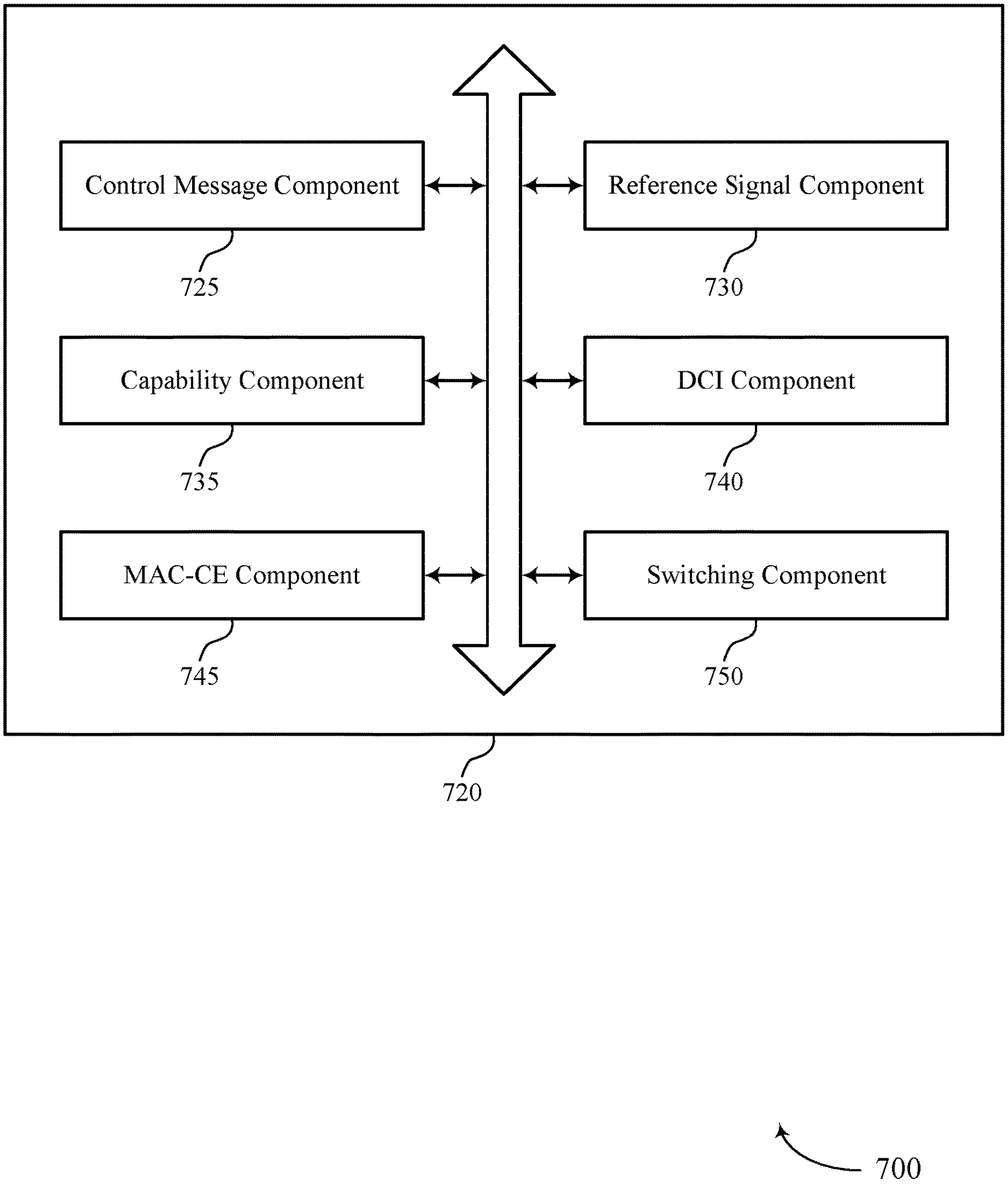
FIG. 7 shows a block diagram of a communications manager that supports slot format switching for multiplexing reference signals and data in accordance with one or more aspects of the present disclosure.

FIG. 7 shows a block diagram 700 of a communications manager 720 that supports slot format switching for multiplexing reference signals and data in accordance with one or more aspects of the present disclosure. The communications manager 720 may be an example of aspects of a communications manager 520, a communications manager 620, or both, as described herein. The communications manager 720, or various components thereof, may be an example of means for performing various aspects of slot format switching for multiplexing reference signals and data as described herein. For example, the communications manager 720 may include a control message component 725, a reference signal component 730, a capability component 735, a DCI component 740, a MAC-CE component 745, a switching component 750, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The control message component 725 is capable of, configured to, or operable to support a means for receiving a control message indicating to switch from a first slot format to a second slot format, where the first slot format includes one or more symbols for reference signal transmissions and one or more symbols for data transmissions, and where the second slot format includes at least one symbol for FDMing a reference signal and data. The reference signal component 730 is capable of, configured to, or operable to support a means for communicating, based on the switch from the first slot format to the second slot format, the reference signal via the at least one symbol, where the reference signal is FDMed with the data in accordance with the second slot format.

In some examples, the second slot format includes at least one symbol for both data and reference signal transmissions and includes at least one symbol for the data transmissions.

In some examples, the DCI component 740 is capable of, configured to, or operable to support a means for receiving DCI activating the at least one symbol for both the data and reference signal transmissions and the at least one symbol for the data transmissions, where the second slot format includes at least a first symbol for the data transmissions that is associated with the UE and a second symbol for both the data and reference signal transmissions that is associated with a second UE.

In some examples, the MAC-CE component 745 is capable of, configured to, or operable to support a means for receiving a MAC-CE activating the at least one symbol for both the data and reference signal transmissions and the at least one symbol for the data transmissions based on an MCS change for a slot.

In some examples, to support communicating the reference signal, the reference signal component 730 is capable of, configured to, or operable to support a means for communicating one or more reference signals via a set of symbols for FDMing the one or more reference signals with the data, where the second slot format includes the set of symbols, and where the set of symbols includes the at least one symbol.

In some examples, to support communicating the one or more reference signals, the reference signal component 730 is capable of, configured to, or operable to support a means for communicating a first reference signal via a first symbol for FDMing the first reference signal with the data for the UE and a second reference signal via a second symbol for FDMing the second reference signal with the data for a second UE, where the second slot format includes the first symbol and the second symbol.

In some examples, to support communicating the reference signal, the reference signal component 730 is capable of, configured to, or operable to support a means for receiving a first reference signal via a first symbol for the reference signal transmissions in accordance with the first slot format. In some examples, to support communicating the reference signal, the reference signal component 730 is capable of, configured to, or operable to support a means for receiving a second reference signal via the at least one symbol in accordance with the second slot format, where the second reference signal is FDMed with the data in the at least one symbol.

In some examples, the capability component 735 is capable of, configured to, or operable to support a means for transmitting a capability message indicating a capability of the UE to switch from the first slot format to the second slot format.

In some examples, the switching component 750 is capable of, configured to, or operable to support a means for switching from the first slot format to the second slot format based on a capability of the UE to support TDMing the reference signal and the data and FDMing the reference signal and the data, where the second slot format includes at least one symbol for both data and reference signal transmissions and includes at least one symbol for the data transmissions.

In some examples, the switching component 750 is capable of, configured to, or operable to support a means for switching from the first slot format to the second slot format based on a capability of the UE to support TDMing the reference signal and the data or FDMing the reference signal and the data, where the second slot format includes at least one symbol for both the data and reference signal transmissions. In some examples, the data is associated with a shared channel and where the reference signal is a DMRS or a CSI-RS.

Figure 8:
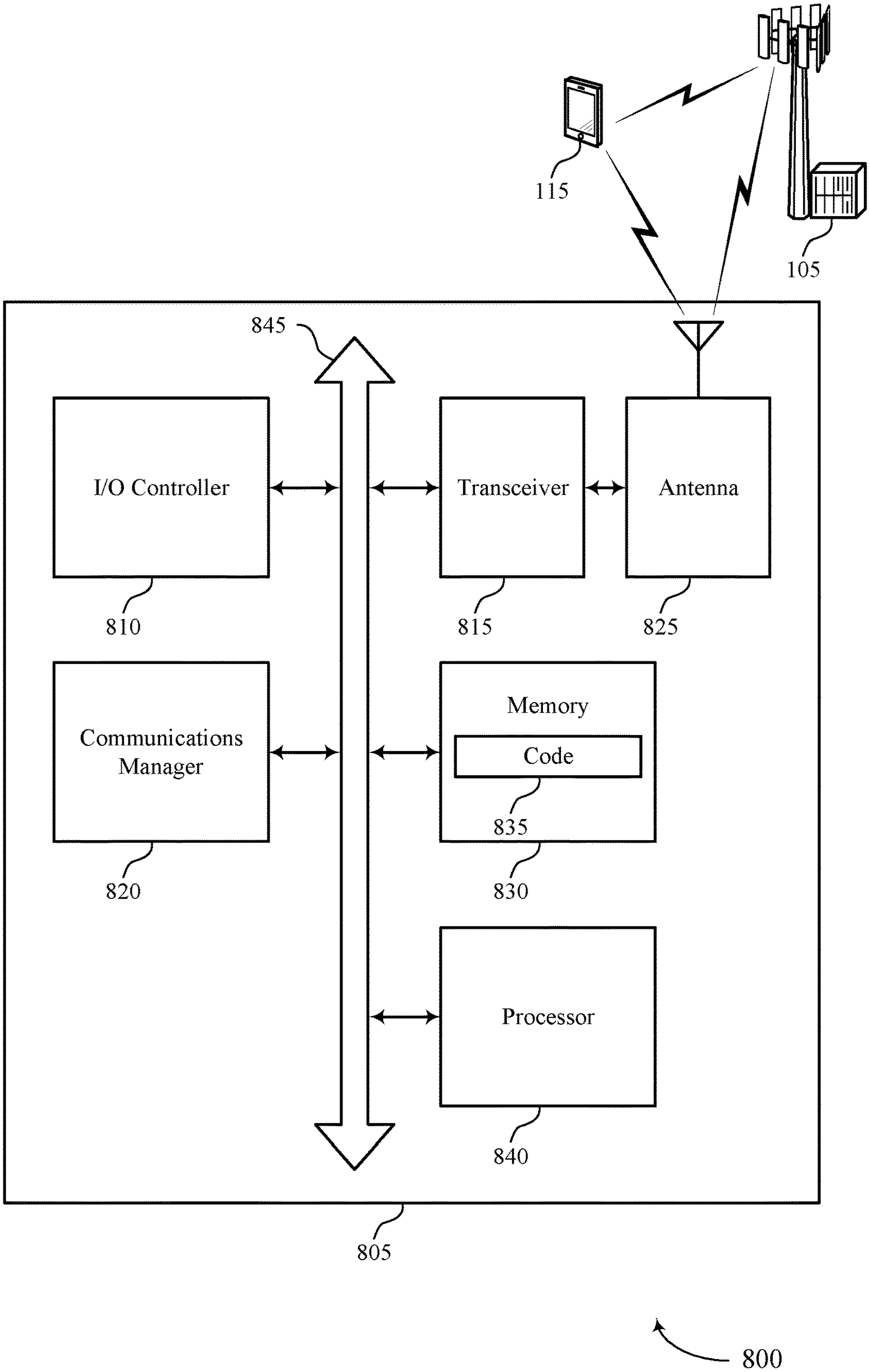
FIG. 8 shows a diagram of a system including a device that supports slot format switching for multiplexing reference signals and data in accordance with one or more aspects of the present disclosure.

FIG. 8 shows a diagram of a system 800 including a device 805 that supports slot format switching for multiplexing reference signals and data in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting slot format switching for multiplexing reference signals and data). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications in accordance with examples as disclosed herein. For example, the communications manager 820 is capable of, configured to, or operable to support a means for receiving a control message indicating to switch from a first slot format to a second slot format, where the first slot format includes one or more symbols for reference signal transmissions and one or more symbols for data transmissions, and where the second slot format includes at least one symbol for FDMing a reference signal and data. The communications manager 820 is capable of, configured to, or operable to support a means for communicating, based at least in part on the switch from the first slot format to the second slot format, the reference signal via the at least one symbol, where the reference signal is FDMed with the data in accordance with the second slot format.

By including or configuring the communications manager 820 in accordance with examples as described herein, the device 805 may support techniques for slot format switching for multiplexing reference signals and data, which may reduce overhead, increase signaling throughput, reduce processing, improve utilization of communication resources, improve channel estimation performance, and improve tracking of time-varying channels.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of slot format switching for multiplexing reference signals and data as described herein, or the at least one processor 840 and the at least one memory 830 may be otherwise configured to, individually or collectively, perform or support such operations.

Figure 9:
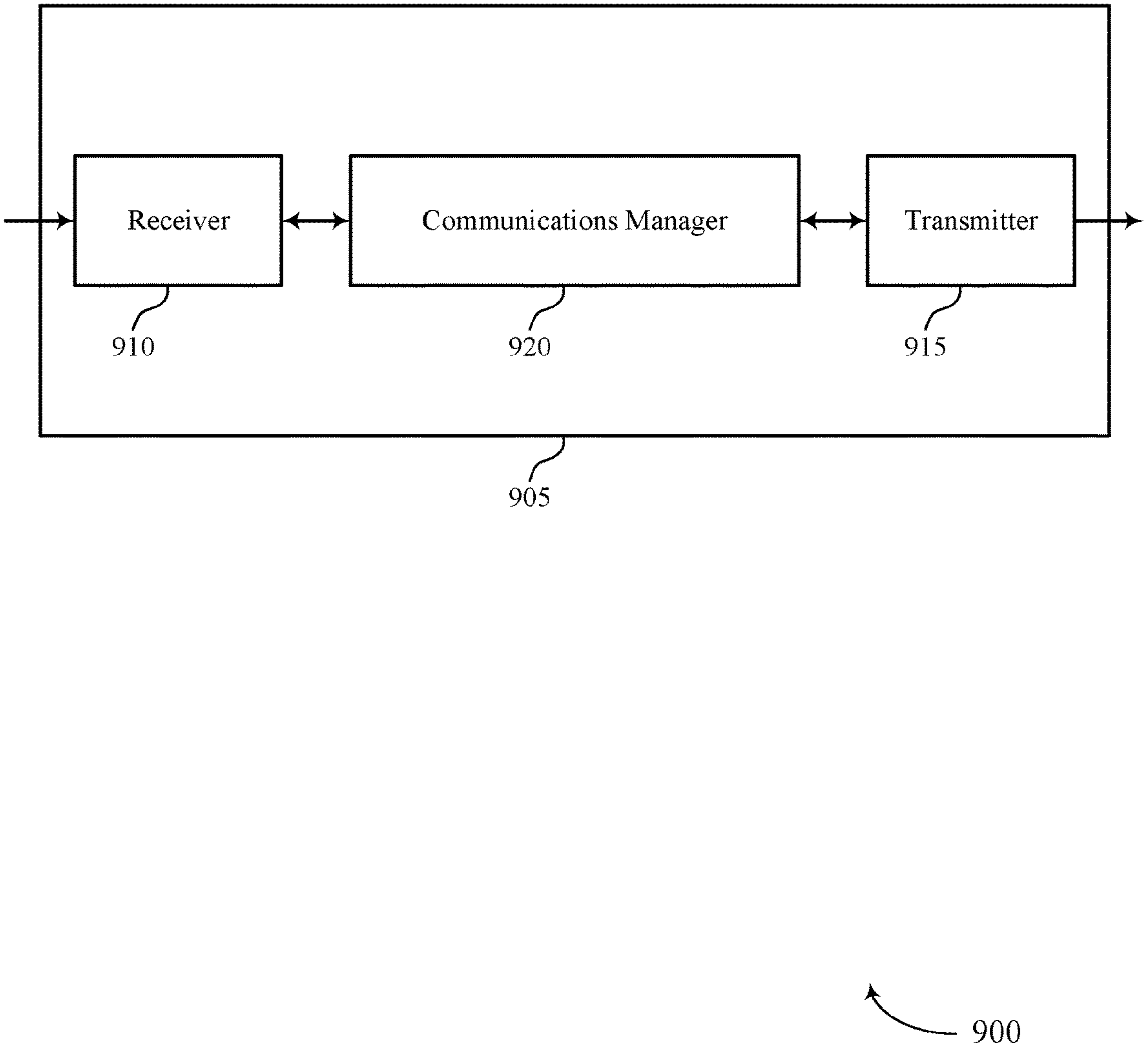
FIGS. 9 and 10 show block diagrams of devices that support slot format switching for multiplexing reference signals and data in accordance with one or more aspects of the present disclosure.

FIG. 9 shows a block diagram 900 of a device 905 that supports slot format switching for multiplexing reference signals and data in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of slot format switching for multiplexing reference signals and data as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data. The communications manager 920 is capable of, configured to, or operable to support a means for communicating, based at least in part on the control message indicating to the UE to switch from the first slot format to the second slot format, the reference signal via the at least one symbol, where the reference signal is FDMed with the data in accordance with the second slot format.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for slot format switching for multiplexing reference signals and data, which may reduce overhead, increase signaling throughput, reduce processing, improve utilization of communication resources, improve channel estimation performance, and improve tracking of time-varying channels.

Figure 10:
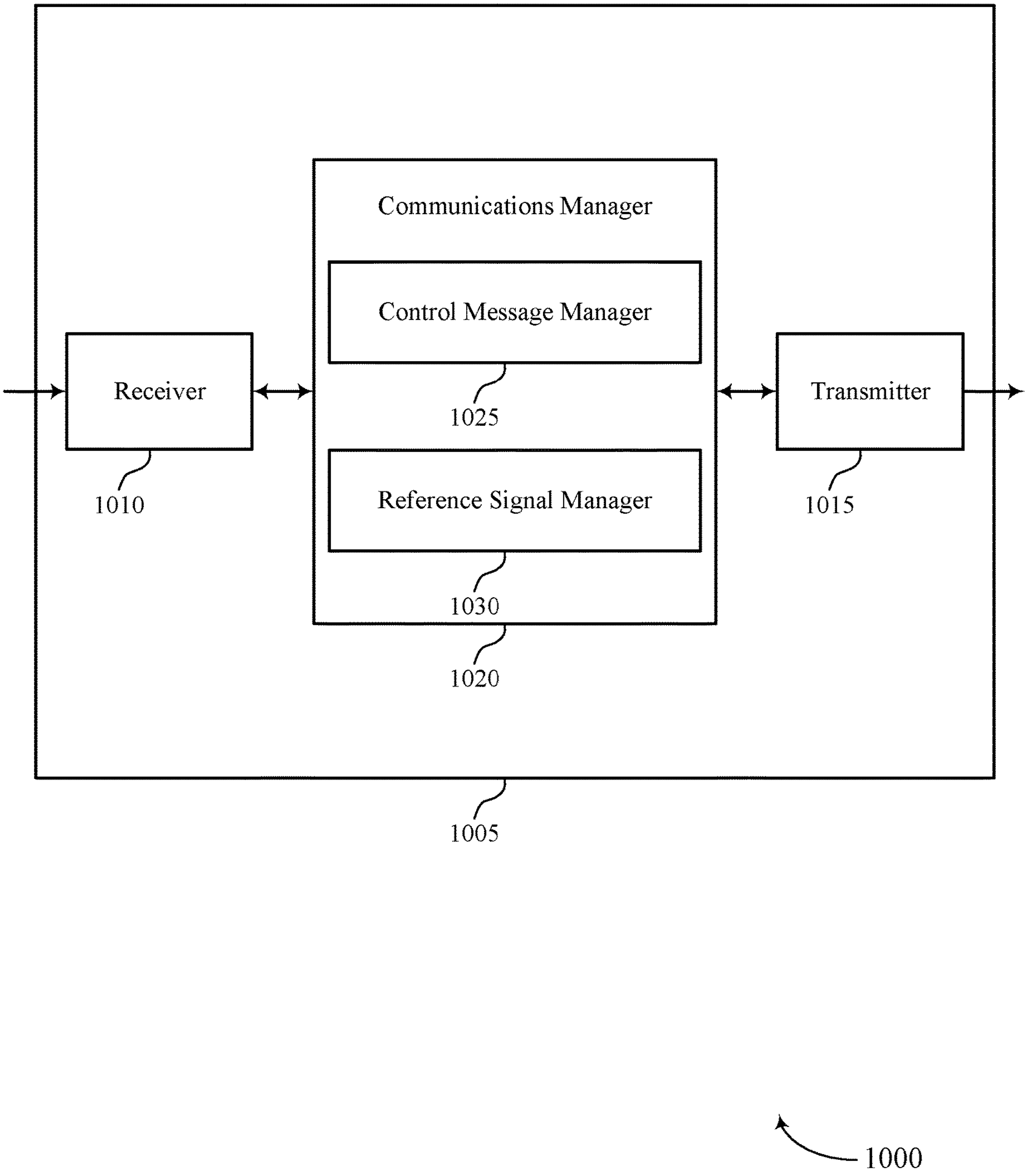

FIG. 10 shows a block diagram 1000 of a device 1005 that supports slot format switching for multiplexing reference signals and data in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of slot format switching for multiplexing reference signals and data as described herein. For example, the communications manager 1020 may include a control message manager 1025, a reference signal manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The control message manager 1025 is capable of, configured to, or operable to support a means for transmitting a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data. The reference signal manager 1030 is capable of, configured to, or operable to support a means for communicating, based on the control message indicating to the UE to switch from the first slot format to the second slot format, the reference signal via the at least one symbol, where the reference signal is FDMed with the data in accordance with the second slot format.

Figure 11:
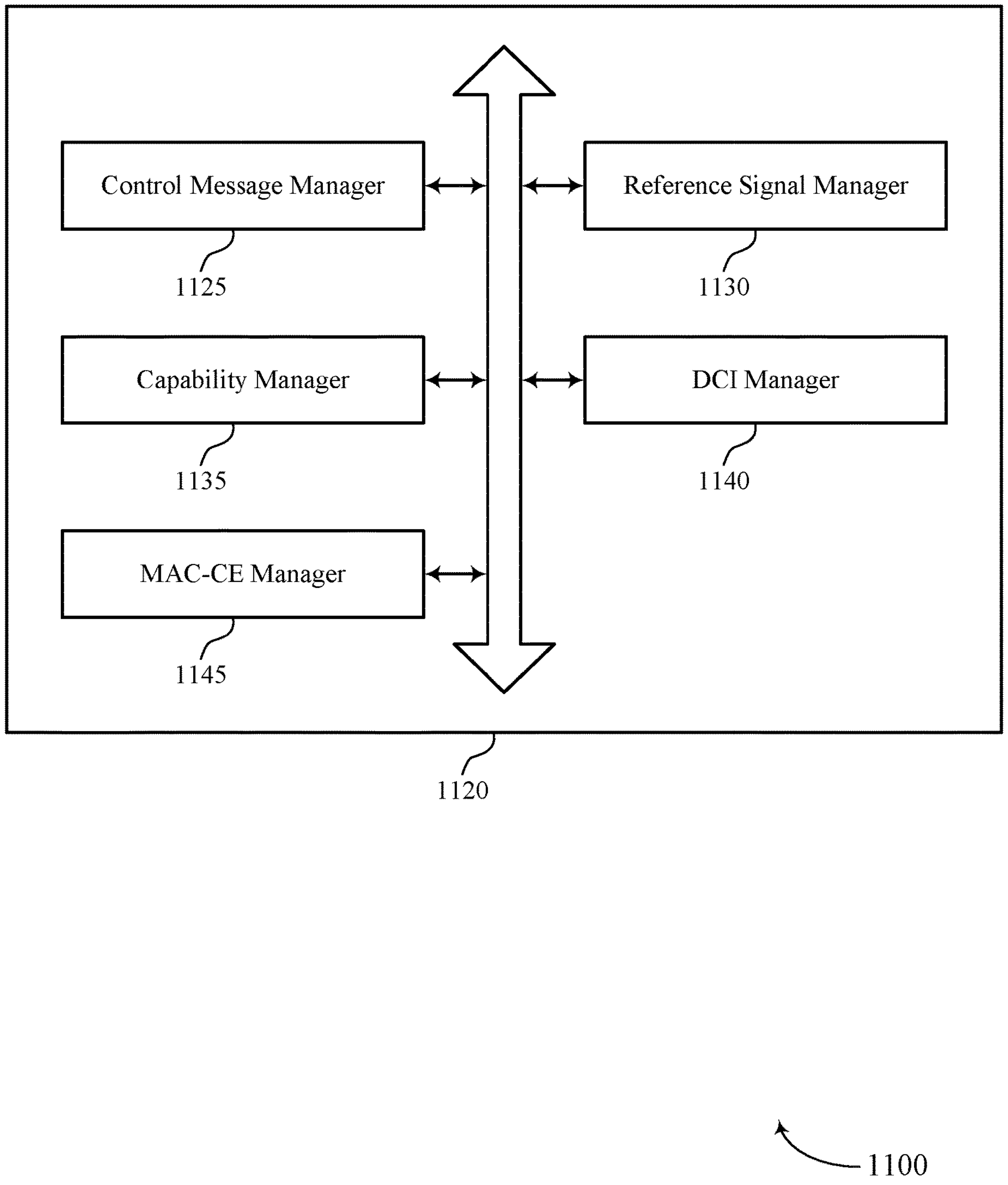
FIG. 11 shows a block diagram of a communications manager that supports slot format switching for multiplexing reference signals and data in accordance with one or more aspects of the present disclosure.

FIG. 11 shows a block diagram 1100 of a communications manager 1120 that supports slot format switching for multiplexing reference signals and data in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of slot format switching for multiplexing reference signals and data as described herein. For example, the communications manager 1120 may include a control message manager 1125, a reference signal manager 1130, a capability manager 1135, a DCI manager 1140, a MAC-CE manager 1145, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The control message manager 1125 is capable of, configured to, or operable to support a means for transmitting a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data. The reference signal manager 1130 is capable of, configured to, or operable to support a means for communicating, based on the control message indicating to the UE to switch from the first slot format to the second slot format, the reference signal via the at least one symbol, where the reference signal is FDMed with the data in accordance with the second slot format. In some examples, the second slot format includes at least one symbol for both data and reference signal transmissions and includes at least one symbol for the data transmissions.

In some examples, the DCI manager 1140 is capable of, configured to, or operable to support a means for transmitting DCI activating the at least one symbol for both the data and reference signal transmissions and the at least one symbol for the data transmissions, where the second slot format includes at least a first symbol for the data transmissions that is associated with the UE and a second symbol for both the data and reference signal transmissions that is associated with a second UE.

In some examples, the MAC-CE manager 1145 is capable of, configured to, or operable to support a means for transmitting a MAC-CE activating the at least one symbol for both the data and reference signal transmissions and the at least one symbol for the data transmissions based on an MCS change for a slot.

In some examples, to support communicating the reference signal, the reference signal manager 1130 is capable of, configured to, or operable to support a means for communicating one or more reference signals via a set of symbols for FDMing the one or more reference signals with the data, where the second slot format includes the set of symbols, and where the set of symbols includes the at least one symbol.

In some examples, to support communicating the one or more reference signals, the reference signal manager 1130 is capable of, configured to, or operable to support a means for communicating a first reference signal via a first symbol for FDMing the first reference signal with the data for the UE and a second reference signal via a second symbol for FDMing the second reference signal with the data for a second UE, where the second slot format includes the first symbol and the second symbol.

In some examples, to support communicating the reference signal, the reference signal manager 1130 is capable of, configured to, or operable to support a means for transmitting a first reference signal via a first symbol for the reference signal transmissions in accordance with the first slot format. In some examples, to support communicating the reference signal, the reference signal manager 1130 is capable of, configured to, or operable to support a means for transmitting a second reference signal via the at least one symbol in accordance with the second slot format, where the second reference signal is FDMed with the data in the at least one symbol.

In some examples, the capability manager 1135 is capable of, configured to, or operable to support a means for receiving a capability message indicating a capability of the UE to switch from the first slot format to the second slot format.

In some examples, the capability message indicates a capability of the UE to support TDMing the reference signal and the data and FDMing the reference signal and the data, and where the second slot format includes at least one symbol for both data and reference signal transmissions and includes at least one symbol for the data transmissions.

In some examples, the capability message indicates a capability of the UE to support TDMing the reference signal and the data or FDMing the reference signal and the data, and where the second slot format includes at least one symbol for both the data and reference signal transmissions. In some examples, the data is associated with a shared channel and where the reference signal is a DMRS or a CSI-RS.

Figure 12:
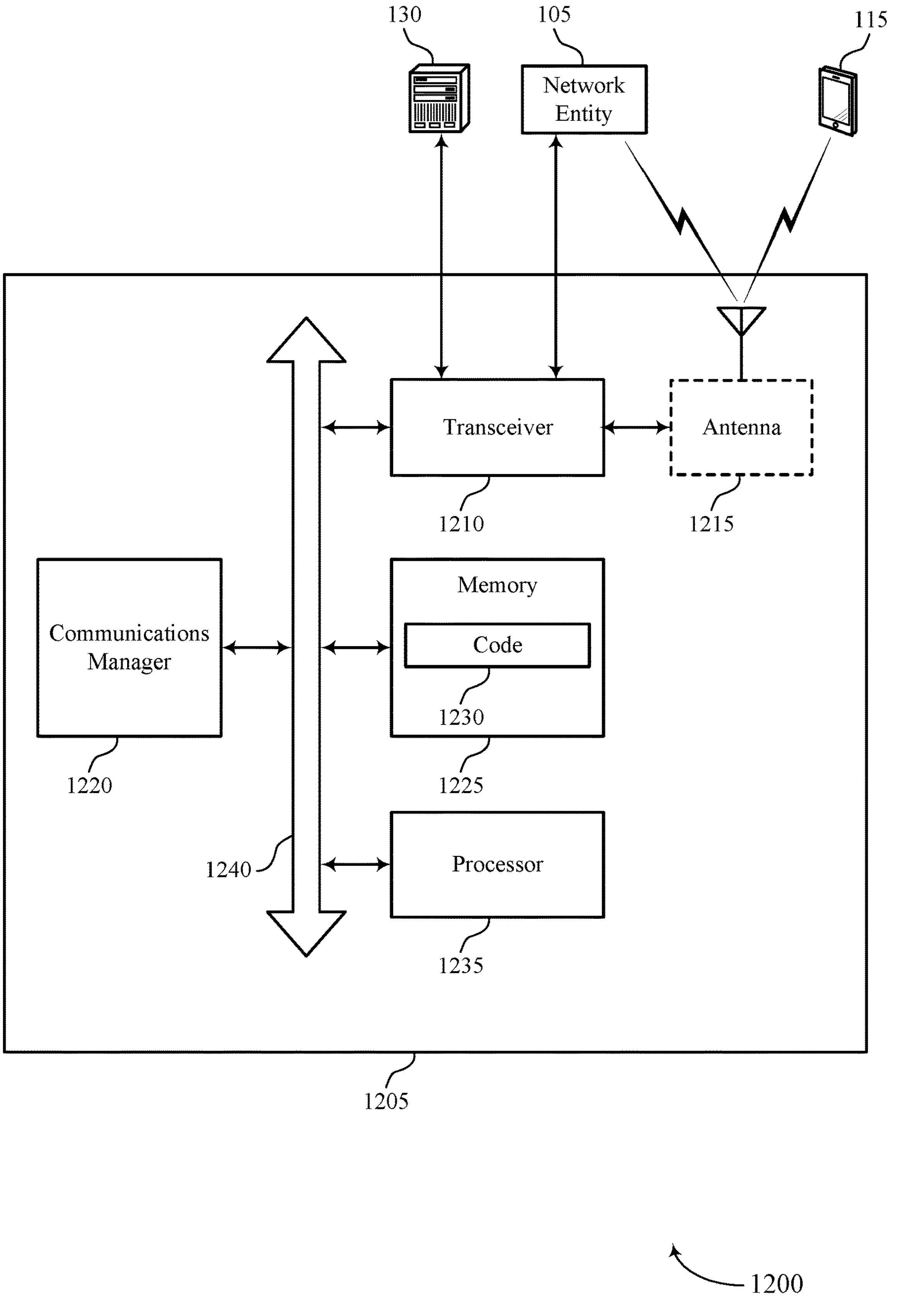
FIG. 12 shows a diagram of a system including a device that supports slot format switching for multiplexing reference signals and data in accordance with one or more aspects of the present disclosure.

FIG. 12 shows a diagram of a system 1200 including a device 1205 that supports slot format switching for multiplexing reference signals and data in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting slot format switching for multiplexing reference signals and data). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data. The communications manager 1220 is capable of, configured to, or operable to support a means for communicating, based at least in part on the control message indicating to the UE to switch from the first slot format to the second slot format, the reference signal via the at least one symbol, where the reference signal is FDMed with the data in accordance with the second slot format.

By including or configuring the communications manager 1220 in accordance with examples as described herein, the device 1205 may support techniques for slot format switching for multiplexing reference signals and data, which may reduce overhead, increase signaling throughput, reduce processing, improve utilization of communication resources, improve channel estimation performance, and improve tracking of time-varying channels.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of slot format switching for multiplexing reference signals and data as described herein, or the at least one processor 1235 and the at least one memory 1225 may be otherwise configured to, individually or collectively, perform or support such operations.

FIG. 13 shows a flowchart illustrating a method 1300 that supports slot format switching for multiplexing reference signals and data in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a control message indicating to switch from a first slot format to a second slot format, where the first slot format includes one or more symbols for reference signal transmissions and one or more symbols for data transmissions, and where the second slot format includes at least one symbol for FDMing a reference signal and data. The operations of 1305 may be performed in accordance with examples as disclosed herein. In some examples, aspects of the operations of 1305 may be performed by a control message component 725 as described with reference to FIG. 7.

At 1310, the method may include communicating, based on the switch from the first slot format to the second slot format, the reference signal via the at least one symbol, where the reference signal is FDMed with the data in accordance with the second slot format. The operations of 1310 may be performed in accordance with examples as disclosed herein. In some examples, aspects of the operations of 1310 may be performed by a reference signal component 730 as described with reference to FIG. 7.

Figure 14:
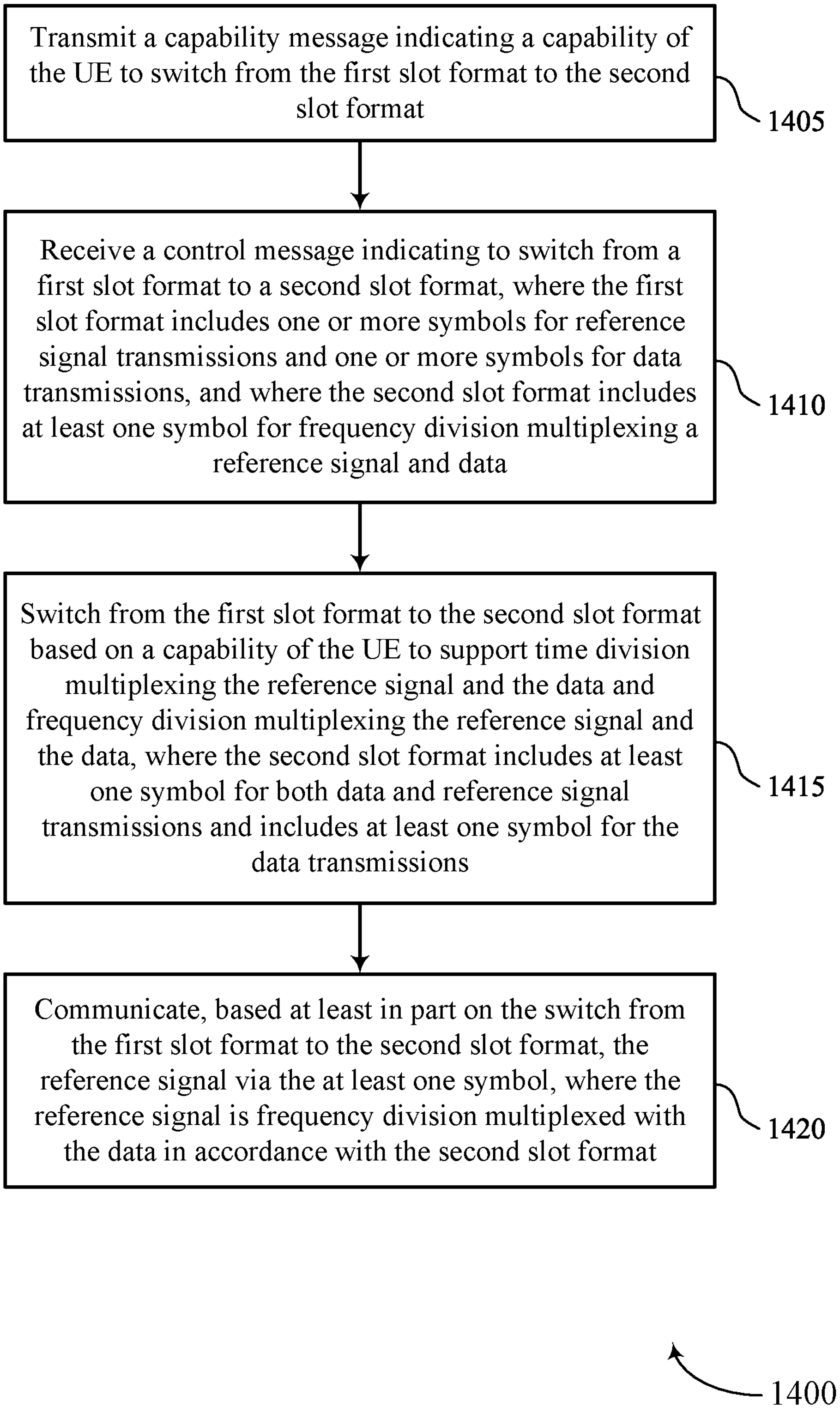

FIG. 14 shows a flowchart illustrating a method 1400 that supports slot format switching for multiplexing reference signals and data in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message indicating a capability of the UE to switch from the first slot format to the second slot format. The operations of 1405 may be performed in accordance with examples as disclosed herein. In some examples, aspects of the operations of 1405 may be performed by a capability component 735 as described with reference to FIG. 7.

At 1410, the method may include receiving a control message indicating to switch from a first slot format to a second slot format, where the first slot format includes one or more symbols for reference signal transmissions and one or more symbols for data transmissions, and where the second slot format includes at least one symbol for FDMing a reference signal and data. The operations of 1410 may be performed in accordance with examples as disclosed herein. In some examples, aspects of the operations of 1410 may be performed by a control message component 725 as described with reference to FIG. 7.

At 1415, the method may include switching from the first slot format to the second slot format based on a capability of the UE to support TDMing the reference signal and the data and FDMing the reference signal and the data, where the second slot format includes at least one symbol for both data and reference signal transmissions and includes at least one symbol for the data transmissions. The operations of 1415 may be performed in accordance with examples as disclosed herein. In some examples, aspects of the operations of 1415 may be performed by a switching component 750 as described with reference to FIG. 7.

At 1420, the method may include communicating, based on the switch from the first slot format to the second slot format, the reference signal via the at least one symbol, where the reference signal is FDMed with the data in accordance with the second slot format. The operations of 1420 may be performed in accordance with examples as disclosed herein. In some examples, aspects of the operations of 1420 may be performed by a reference signal component 730 as described with reference to FIG. 7.

Figure 15:
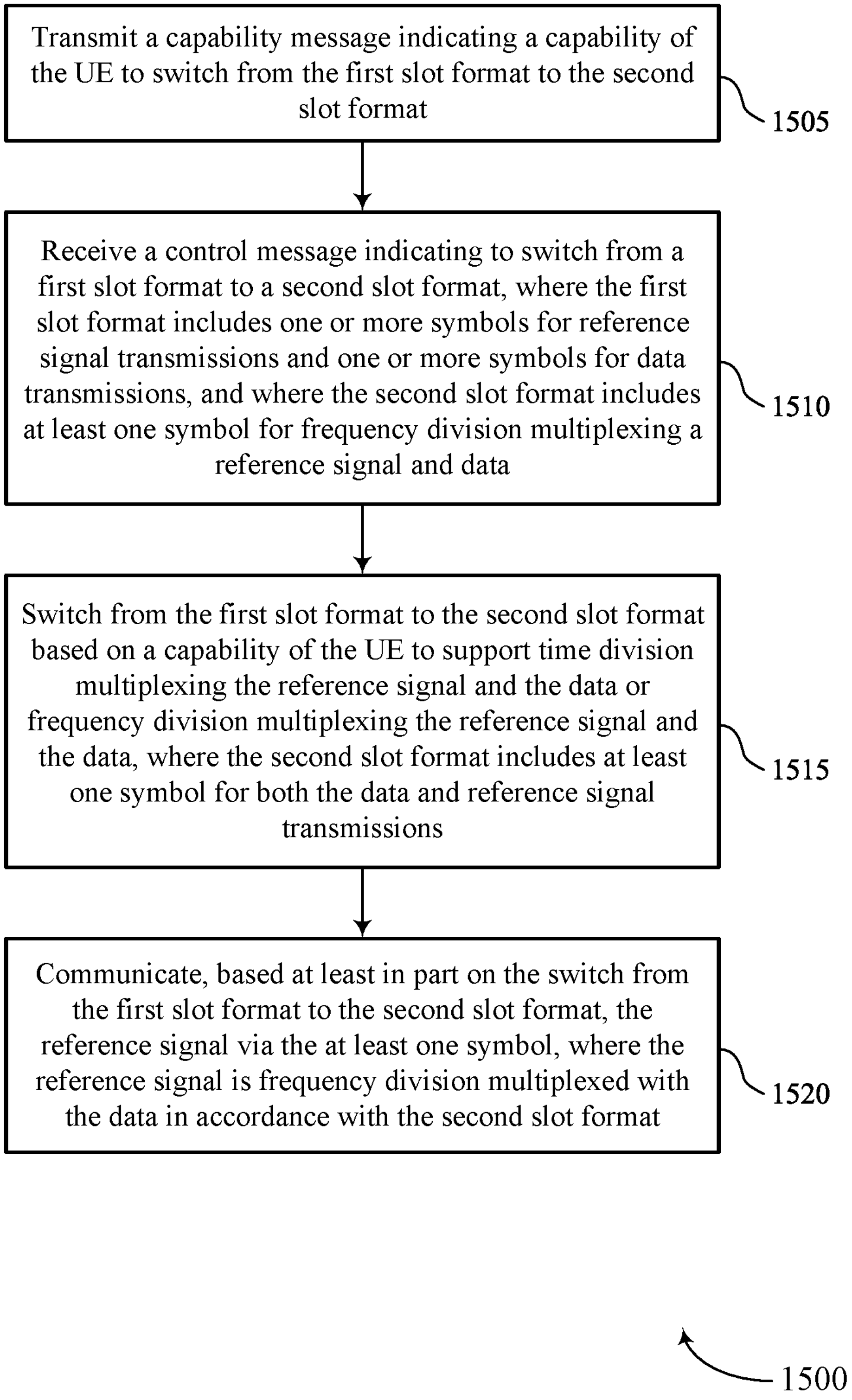

FIG. 15 shows a flowchart illustrating a method 1500 that supports slot format switching for multiplexing reference signals and data in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a capability message indicating a capability of the UE to switch from the first slot format to the second slot format. The operations of 1505 may be performed in accordance with examples as disclosed herein. In some examples, aspects of the operations of 1505 may be performed by a capability component 735 as described with reference to FIG. 7.

At 1510, the method may include receiving a control message indicating to switch from a first slot format to a second slot format, where the first slot format includes one or more symbols for reference signal transmissions and one or more symbols for data transmissions, and where the second slot format includes at least one symbol for FDMing a reference signal and data. The operations of 1510 may be performed in accordance with examples as disclosed herein. In some examples, aspects of the operations of 1510 may be performed by a control message component 725 as described with reference to FIG. 7.

At 1515, the method may include switching from the first slot format to the second slot format based on a capability of the UE to support TDMing the reference signal and the data or FDMing the reference signal and the data, where the second slot format includes at least one symbol for both the data and reference signal transmissions. The operations of 1515 may be performed in accordance with examples as disclosed herein. In some examples, aspects of the operations of 1515 may be performed by a switching component 750 as described with reference to FIG. 7.

At 1520, the method may include communicating, based on the switch from the first slot format to the second slot format, the reference signal via the at least one symbol, where the reference signal is FDMed with the data in accordance with the second slot format. The operations of 1520 may be performed in accordance with examples as disclosed herein. In some examples, aspects of the operations of 1520 may be performed by a reference signal component 730 as described with reference to FIG. 7.

FIG. 16 shows a flowchart illustrating a method 1600 that supports slot format switching for multiplexing reference signals and data in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a control message indicating to a UE to switch from a first slot format to a second slot format, where the first slot format includes one or more symbols for reference signal transmissions and one or more symbols for data transmissions, and where the second slot format includes at least one symbol for FDMing a reference signal and data. The operations of 1605 may be performed in accordance with examples as disclosed herein. In some examples, aspects of the operations of 1605 may be performed by a control message manager 1125 as described with reference to FIG. 11.

At 1610, the method may include communicating, based on the control message indicating to the UE to switch from the first slot format to the second slot format, the reference signal via the at least one symbol, where the reference signal is FDMed with the data in accordance with the second slot format. The operations of 1610 may be performed in accordance with examples as disclosed herein. In some examples, aspects of the operations of 1610 may be performed by a reference signal manager 1130 as described with reference to FIG. 11.

FIG. 17 shows a flowchart illustrating a method 1700 that supports slot format switching for multiplexing reference signals and data in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a control message indicating to a UE to switch from a first slot format to a second slot format, where the first slot format includes one or more symbols for reference signal transmissions and one or more symbols for data transmissions, and where the second slot format includes at least one symbol for both data and reference signal transmissions and includes at least one symbol for the data transmissions. The operations of 1705 may be performed in accordance with examples as disclosed herein. In some examples, aspects of the operations of 1705 may be performed by a control message manager 1125 as described with reference to FIG. 11.

At 1710, the method may include transmitting DCI activating the at least one symbol for both the data and reference signal transmissions and the at least one symbol for the data transmissions, where the second slot format includes at least a first symbol for the data transmissions that is associated with the UE and a second symbol for both the data and reference signal transmissions that is associated with a second UE. The operations of 1710 may be performed in accordance with examples as disclosed herein. In some examples, aspects of the operations of 1710 may be performed by a DCI manager 1140 as described with reference to FIG. 11.

At 1715, the method may include communicating, based on the control message indicating to the UE to switch from the first slot format to the second slot format, the reference signal via the at least one symbol, where the reference signal is FDMed with the data in accordance with the second slot format. The operations of 1715 may be performed in accordance with examples as disclosed herein. In some examples, aspects of the operations of 1715 may be performed by a reference signal manager 1130 as described with reference to FIG. 11.

FIG. 18 shows a flowchart illustrating a method 1800 that supports slot format switching for multiplexing reference signals and data in accordance with aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a control message indicating to a UE to switch from a first slot format to a second slot format, where the first slot format includes one or more symbols for reference signal transmissions and one or more symbols for data transmissions, and where the second slot format includes at least one symbol for both data and reference signal transmissions and includes at least one symbol for the data transmissions. The operations of 1805 may be performed in accordance with examples as disclosed herein. In some examples, aspects of the operations of 1805 may be performed by a control message manager 1125 as described with reference to FIG. 11.

At 1810, the method may include transmitting a MAC-CE activating the at least one symbol for both the data and reference signal transmissions and the at least one symbol for the data transmissions based on an MCS change for a slot. The operations of 1810 may be performed in accordance with examples as disclosed herein. In some examples, aspects of the operations of 1810 may be performed by a MAC-CE manager 1145 as described with reference to FIG. 11.

At 1815, the method may include communicating, based on the control message indicating to the UE to switch from the first slot format to the second slot format, the reference signal via the at least one symbol, where the reference signal is FDMed with the data in accordance with the second slot format. The operations of 1815 may be performed in accordance with examples as disclosed herein. In some examples, aspects of the operations of 1815 may be performed by a reference signal manager 1130 as described with reference to FIG. 11.

The following provides an overview of aspects of the present disclosure:

Aspect 1: A method for wireless communications at a UE, comprising: receiving a control message indicating to switch from a first slot format to a second slot format, wherein the first slot format comprises one or more symbols for reference signal transmissions and one or more symbols for data transmissions, and wherein the second slot format comprises at least one symbol for FDMing a reference signal and data; and communicating, based at least in part on the switch from the first slot format to the second slot format, the reference signal via the at least one symbol, wherein the reference signal is FDMed with the data in accordance with the second slot format.

Aspect 2: The method of aspect 1, wherein the second slot format comprises at least one symbol for both data and reference signal transmissions and comprises at least one symbol for the data transmissions.

Aspect 3: The method of aspect 2, further comprising: receiving DCI activating the at least one symbol for both the data and reference signal transmissions and the at least one symbol for the data transmissions, wherein the second slot format comprises at least a first symbol for the data transmissions that is associated with the UE and a second symbol for both the data and reference signal transmissions that is associated with a second UE.

Aspect 4: The method of any of aspects 2 through 3, further comprising: receiving a MAC-CE activating the at least one symbol for both the data and reference signal transmissions and the at least one symbol for the data transmissions based at least in part on an MCS change for a slot.

Aspect 5: The method of any of aspects 1 through 4, wherein communicating the reference signal comprises: communicating one or more reference signals via a set of symbols for FDMing the one or more reference signals with the data, wherein the second slot format comprises the set of symbols, and wherein the set of symbols comprises the at least one symbol.

Aspect 6: The method of aspect 5, wherein communicating the one or more reference signals comprises: communicating a first reference signal via a first symbol for FDMing the first reference signal with the data for the UE and a second reference signal via a second symbol for FDMing the second reference signal with the data for a second UE, wherein the second slot format comprises the first symbol and the second symbol.

Aspect 7: The method of any of aspects 1 through 6, wherein communicating the reference signal comprises: receiving a first reference signal via a first symbol for the reference signal transmissions in accordance with the first slot format; and receiving a second reference signal via the at least one symbol in accordance with the second slot format, wherein the second reference signal is FDMed with the data in the at least one symbol.

Aspect 8: The method of any of aspects 1 through 7, further comprising: transmitting a capability message indicating a capability of the UE to switch from the first slot format to the second slot format.

Aspect 9: The method of aspect 8, further comprising: switching from the first slot format to the second slot format based at least in part on a capability of the UE to support TDMing the reference signal and the data and FDMing the reference signal and the data, wherein the second slot format comprises at least one symbol for both data and reference signal transmissions and comprises at least one symbol for the data transmissions.

Aspect 10: The method of any of aspects 8 through 9, further comprising: switching from the first slot format to the second slot format based at least in part on a capability of the UE to support TDMing the reference signal and the data or FDMing the reference signal and the data, wherein the second slot format comprises at least one symbol for both the data and reference signal transmissions.

Aspect 11: The method of any of aspects 1 through 10, wherein the data is associated with a shared channel and wherein the reference signal is a DMRS or a CSI-RS.

Aspect 12: A method for wireless communications at a network entity, comprising: transmitting a control message indicating to a UE to switch from a first slot format to a second slot format, wherein the first slot format comprises one or more symbols for reference signal transmissions and one or more symbols for data transmissions, and wherein the second slot format comprises at least one symbol for FDMing a reference signal and data; and communicating, based at least in part on the control message indicating to the UE to switch from the first slot format to the second slot format, the reference signal via the at least one symbol, wherein the reference signal is FDMed with the data in accordance with the second slot format.

Aspect 13: The method of aspect 12, wherein the second slot format comprises at least one symbol for both data and reference signal transmissions and comprises at least one symbol for the data transmissions.

Aspect 14: The method of aspect 13, further comprising: transmitting DCI activating the at least one symbol for both the data and reference signal transmissions and the at least one symbol for the data transmissions, wherein the second slot format comprises at least a first symbol for the data transmissions that is associated with the UE and a second symbol for both the data and reference signal transmissions that is associated with a second UE.

Aspect 15: The method of any of aspects 13 through 14, further comprising: transmitting a MAC-CE activating the at least one symbol for both the data and reference signal transmissions and the at least one symbol for the data transmissions based at least in part on an MCS change for a slot.

Aspect 16: The method of any of aspects 12 through 15, wherein communicating the reference signal comprises: communicating one or more reference signals via a set of symbols for FDMing the one or more reference signals with the data, wherein the second slot format comprises the set of symbols, and wherein the set of symbols comprises the at least one symbol.

Aspect 17: The method of aspect 16, wherein communicating the one or more reference signals comprises: communicating a first reference signal via a first symbol for FDMing the first reference signal with the data for the UE and a second reference signal via a second symbol for FDMing the second reference signal with the data for a second UE, wherein the second slot format comprises the first symbol and the second symbol.

Aspect 18: The method of any of aspects 12 through 17, wherein communicating the reference signal comprises: transmitting a first reference signal via a first symbol for the reference signal transmissions in accordance with the first slot format; and transmitting a second reference signal via the at least one symbol in accordance with the second slot format, wherein the second reference signal is FDMed with the data in the at least one symbol.

Aspect 19: The method of any of aspects 12 through 18, further comprising: receiving a capability message indicating a capability of the UE to switch from the first slot format to the second slot format.

Aspect 20: The method of aspect 19, wherein the capability message indicates a capability of the UE to support TDMing the reference signal and the data and FDMing the reference signal and the data, and wherein the second slot format comprises at least one symbol for both data and reference signal transmissions and comprises at least one symbol for the data transmissions.

Aspect 21: The method of any of aspects 19 through 20, wherein the capability message indicates a capability of the UE to support TDMing the reference signal and the data or FDMing the reference signal and the data, and wherein the second slot format comprises at least one symbol for both the data and reference signal transmissions.

Aspect 22: The method of any of aspects 12 through 21, wherein the data is associated with a shared channel and wherein the reference signal is a DMRS or a CSI-RS.

Aspect 23: A UE for wireless communications, comprising one or more memories storing processor-executable code, and one or more processors coupled with the one or more memories and individually or collectively operable to execute the code to cause the UE to perform a method of any of aspects 1 through 11.

Aspect 24: A UE for wireless communications, comprising at least one means for performing a method of any of aspects 1 through 11.

Aspect 25: A non-transitory computer-readable medium storing code for wireless communications, the code comprising instructions executable by a processor to perform a method of any of aspects 1 through 11.

Aspect 26: A network entity for wireless communications, comprising one or more memories storing processor-executable code, and one or more processors coupled with the one or more memories and individually or collectively operable to execute the code to cause the network entity to perform a method of any of aspects 12 through 22.

Aspect 27: A network entity for wireless communications, comprising at least one means for performing a method of any of aspects 12 through 22.

Aspect 28: A non-transitory computer-readable medium storing code for wireless communications, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors; and instructions stored in one or more memories and executable by the one or more processors, individually or collectively, to cause the apparatus to:

receive a control message indicating to switch from a first slot format to a second slot format, wherein the first slot format comprises one or more symbols for reference signal transmissions and one or more symbols for data transmissions, wherein the one or more symbols for data transmissions of the first slot format correspond to one or more first physical shared channels and are time division multiplexed with the one or more symbols for reference signal transmissions, and wherein the second slot format comprises at least one symbol for both data and reference signal transmissions, at least one symbol for the data transmissions, and at least one symbol for frequency division multiplexing a reference signal and data, wherein the data correspond to one or more second physical shared channels;

receive downlink control information activating the at least one symbol for both the data and reference signal transmissions and the at least one symbol for the data transmissions, wherein the second slot format further comprises at least a first symbol for the data transmissions that is associated with the UE and a second symbol for both the data and reference signal transmissions that is associated with a second UE; and communicate, based at least in part on the switch from the first slot format to the second slot format, the reference signal via the at least one symbol, wherein the reference signal is frequency division multiplexed with the data in accordance with the second slot format.

2. The apparatus of claim 1, wherein, to communicate the reference signal, the one or more processors are individually or collectively operable to execute the instructions to cause the apparatus to:

communicate one or more reference signals via a set of symbols for frequency division multiplexing the one or more reference signals with the data, wherein the second slot format comprises the set of symbols, and wherein the set of symbols comprises the at least one symbol.

3. The apparatus of claim 2, wherein, to communicate the one or more reference signals, the one or more processors are individually or collectively operable to execute the instructions to cause the apparatus to:

communicate a first reference signal via a first symbol for frequency division multiplexing the first reference signal with the data for the UE and a second reference signal via a second symbol for frequency division multiplexing the second reference signal with the data for a second UE, wherein the second slot format comprises the first symbol and the second symbol.

4. The apparatus of claim 1, wherein, to communicate the reference signal, the one or more processors are individually or collectively operable to execute the instructions to cause the apparatus to:

receive a first reference signal via a first symbol for the reference signal transmissions in accordance with the first slot format; and receive a second reference signal via the at least one symbol in accordance with the second slot format, wherein the second reference signal is frequency division multiplexed with the data in the at least one symbol.

5. The apparatus of claim 1, wherein the one or more processors are individually or collectively further operable to execute the instructions to cause the apparatus to:

transmit a capability message indicating a capability of the UE to switch from the first slot format to the second slot format.

6. The apparatus of claim 5, wherein the one or more processors are individually or collectively further operable to execute the instructions to cause the apparatus to:

switch from the first slot format to the second slot format based at least in part on a capability of the UE to support time division multiplexing the reference signal and the data and frequency division multiplexing the reference signal and the data, wherein the second slot format comprises at least one symbol for both data and reference signal transmissions and comprises at least one symbol for the data transmissions.

7. The apparatus of claim 5, wherein the one or more processors are individually or collectively further operable to execute the instructions to cause the apparatus to:

switch from the first slot format to the second slot format based at least in part on a capability of the UE to support time division multiplexing the reference signal and the data or frequency division multiplexing the reference signal and the data, wherein the second slot format comprises at least one symbol for both the data and reference signal transmissions.

8. The apparatus of claim 1, wherein the data is associated with a shared channel and wherein the reference signal is a demodulation reference signal or a channel state information reference signal.

9. An apparatus for wireless communications at a network entity, comprising:

one or more processors; and instructions stored in one or more memories and executable by the one or more processors, individually or collectively, to cause the apparatus to:

transmit a control message indicating to a user equipment (UE) to switch from a first slot format to a second slot format, wherein the first slot format comprises one or more symbols for reference signal transmissions and one or more symbols for data transmissions, wherein the one or more symbols for data transmissions of the first slot format correspond to one or more first physical shared channels and are time division multiplexed with the one or more symbols for reference signal transmissions, and wherein the second slot format comprises at least one symbol for both data and reference signal transmissions, at least one symbol for the data transmissions, and at least one symbol for frequency division multiplexing a reference signal and data, wherein the data correspond to one or more second physical shared channels;

transmit downlink control information activating the at least one symbol for both the data and reference signal transmissions and the at least one symbol for the data transmissions, wherein the second slot format further comprises at least a first symbol for the data transmissions that is associated with the UE and a second symbol for both the data and reference signal transmissions that is associated with a second UE; and communicate, based at least in part on the control message indicating to the UE to switch from the first slot format to the second slot format, the reference signal via the at least one symbol, wherein the reference signal is frequency division multiplexed with the data in accordance with the second slot format.

10. The apparatus of claim 9, wherein, to communicate the reference signal, the one or more processors are individually or collectively operable to execute the instructions to cause the apparatus to:

communicate one or more reference signals via a set of symbols for frequency division multiplexing the one or more reference signals with the data, wherein the second slot format comprises the set of symbols, and wherein the set of symbols comprises the at least one symbol.

11. The apparatus of claim 10, wherein, to communicate the one or more reference signals, the one or more processors are individually or collectively operable to execute the instructions to cause the apparatus to:

communicate a first reference signal via a first symbol for frequency division multiplexing the first reference signal with the data for the UE and a second reference signal via a second symbol for frequency division multiplexing the second reference signal with the data for a second UE, wherein the second slot format comprises the first symbol and the second symbol.

12. The apparatus of claim 9, wherein, to communicate the reference signal, the one or more processors are individually or collectively operable to execute the instructions to cause the apparatus to:

transmit a first reference signal via a first symbol for the reference signal transmissions in accordance with the first slot format; and transmit a second reference signal via the at least one symbol in accordance with the second slot format, wherein the second reference signal is frequency division multiplexed with the data in the at least one symbol.

13. The apparatus of claim 9, wherein the one or more processors are individually or collectively further operable to execute the instructions to cause the apparatus to:

receive a capability message indicating a capability of the UE to switch from the first slot format to the second slot format.

14. The apparatus of claim 13, wherein the capability message indicates a capability of the UE to support time division multiplexing the reference signal and the data and frequency division multiplexing the reference signal and the data, and wherein the second slot format comprises at least one symbol for both data and reference signal transmissions and comprises at least one symbol for the data transmissions.

15. The apparatus of claim 13, wherein the capability message indicates a capability of the UE to support time division multiplexing the reference signal and the data or frequency division multiplexing the reference signal and the data, and wherein the second slot format comprises at least one symbol for both the data and reference signal transmissions.

16. The apparatus of claim 9, wherein the data is associated with a shared channel and wherein the reference signal is a demodulation reference signal or a channel state information reference signal.

17. A method for wireless communications at a user equipment (UE), comprising:

receiving a control message indicating to switch from a first slot format to a second slot format, wherein the first slot format comprises one or more symbols for reference signal transmissions and one or more symbols for data transmissions, wherein the one or more symbols for data transmissions of the first slot format correspond to one or more first physical shared channels and are time division multiplexed with the one or more symbols for reference signal transmissions, and wherein the second slot format comprises at least one symbol for both data and reference signal transmissions, at least one symbol for the data transmissions, and at least one symbol for frequency division multiplexing a reference signal and data, wherein the data correspond to one or more second physical shared channels;

receiving downlink control information activating the at least one symbol for both the data and reference signal transmissions and the at least one symbol for the data transmissions, wherein the second slot format further comprises at least a first symbol for the data transmissions that is associated with the UE and a second symbol for both the data and reference signal transmissions that is associated with a second UE; and communicating, based at least in part on the switch from the first slot format to the second slot format, the reference signal via the at least one symbol, wherein the reference signal is frequency division multiplexed with the data in accordance with the second slot format.

18. A method for wireless communications at a network entity, comprising:

transmitting a control message indicating to a user equipment (UE) to switch from a first slot format to a second slot format, wherein the first slot format comprises one or more symbols for reference signal transmissions and one or more symbols for data transmissions, wherein the one or more symbols for data transmissions of the first slot format correspond to one or more first physical shared channels and are time division multiplexed with the one or more symbols for reference signal transmissions, and wherein the second slot format comprises at least one symbol for both data and reference signal transmissions, at least one symbol for the data transmissions, and at least one symbol for frequency division multiplexing a reference signal and data, wherein the data correspond to one or more second physical shared channels;

transmitting downlink control information activating the at least one symbol for both the data and reference signal transmissions and the at least one symbol for the data transmissions, wherein the second slot format further comprises at least a first symbol for the data transmissions that is associated with the UE and a second symbol for both the data and reference signal transmissions that is associated with a second UE; and communicating, based at least in part on the control message indicating to the UE to switch from the first slot format to the second slot format, the reference signal via the at least one symbol, wherein the reference signal is frequency division multiplexed with the data in accordance with the second slot format.

19. The method of claim 17, wherein communicating the reference signal comprises:

communicating one or more reference signals via a set of symbols for frequency division multiplexing the one or more reference signals with the data, wherein the second slot format comprises the set of symbols, and wherein the set of symbols comprises the at least one symbol.

20. The method of claim 19, wherein communicating the one or more reference signals comprises:

communicating a first reference signal via a first symbol for frequency division multiplexing the first reference signal with the data for the UE and a second reference signal via a second symbol for frequency division multiplexing the second reference signal with the data for a second UE, wherein the second slot format comprises the first symbol and the second symbol.

21. The method of claim 17, wherein communicating the reference signal comprises:

receiving a first reference signal via a first symbol for the reference signal transmissions in accordance with the first slot format; and receiving a second reference signal via the at least one symbol in accordance with the second slot format, wherein the second reference signal is frequency division multiplexed with the data in the at least one symbol.

22. The method of claim 18, wherein communicating the reference signal comprises:

communicating one or more reference signals via a set of symbols for frequency division multiplexing the one or more reference signals with the data, wherein the second slot format comprises the set of symbols, and wherein the set of symbols comprises the at least one symbol.

23. The method of claim 22, wherein communicating the one or more reference signals comprises:

communicating a first reference signal via a first symbol for frequency division multiplexing the first reference signal with the data for the UE and a second reference signal via a second symbol for frequency division multiplexing the second reference signal with the data for a second UE, wherein the second slot format comprises the first symbol and the second symbol.

24. The method of claim 18, wherein communicating the reference signal comprises:

transmitting a first reference signal via a first symbol for the reference signal transmissions in accordance with the first slot format; and transmitting a second reference signal via the at least one symbol in accordance with the second slot format, wherein the second reference signal is frequency division multiplexed with the data in the at least one symbol.

* * * * *